(12) United States Patent
Burns

(10) Patent No.: US 12,443,750 B2
(45) Date of Patent: Oct. 14, 2025

(54) CONTEXT-BASED ENTROPY MANAGEMENT

(71) Applicant: TWILIO INC., San Francisco, CA (US)

(72) Inventor: Jonathan Thomas Burns, Annapolis, MD (US)

(73) Assignee: Twilio Inc., San Francisco, CA (US)

( * ) Notice: Subject to any disclaimer, the term of this patent is extended or adjusted under 35 U.S.C. 154(b) by 466 days.

(21) Appl. No.: 17/857,544

(22) Filed: Jul. 5, 2022

(65) Prior Publication Data

US 2024/0020414 A1 Jan. 18, 2024

(51) Int. Cl.
*G06F 21/62* (2013.01)
*G06F 21/60* (2013.01)

(52) U.S. Cl.
CPC ........ *G06F 21/6254* (2013.01); *G06F 21/602* (2013.01)

(58) Field of Classification Search
CPC ............................ G06F 21/6254; G06F 21/602
See application file for complete search history.

(56) References Cited

U.S. PATENT DOCUMENTS

| | | | | |
|---|---|---|---|---|
| 11,144,669 | B1* | 10/2021 | Rao | G06N 7/01 |
| 11,531,846 | B1* | 12/2022 | Bodapati | G06N 20/00 |
| 2014/0040172 | A1* | 2/2014 | Ling | G06N 5/022 706/12 |
| 2014/0123304 | A1* | 5/2014 | Rachlin | G06F 21/6254 726/26 |
| 2019/0266353 | A1* | 8/2019 | Gkoulalas-Divanis | G06F 21/602 |
| 2019/0303615 | A1* | 10/2019 | Gkoulalas-Divanis | G06F 21/6245 |
| 2020/0293675 | A1* | 9/2020 | Antonatos | G06F 21/6218 |
| 2021/0200851 | A1* | 7/2021 | Perry | H04L 9/3231 |
| 2021/0256160 | A1* | 8/2021 | Hachey | G06N 20/00 |
| 2021/0374605 | A1* | 12/2021 | Qian | G06F 21/6263 |
| 2022/0147654 | A1* | 5/2022 | Beach | G06F 21/6254 |
| 2022/0335154 | A1* | 10/2022 | Schuler | G06N 7/01 |
| 2023/0102892 | A1* | 3/2023 | Wu | G06F 40/30 707/737 |
| 2023/0376854 | A1* | 11/2023 | Juarez | G06N 20/00 |

OTHER PUBLICATIONS

J. Ding and B. Ding, "Interval Privacy: A Framework for Privacy-Preserving Data Collection," in IEEE Transactions on Signal Processing, vol. 70, pp. 2443-2459, 2022. (Year: 2022).*
Xia, Weiyi, et al. "Process-driven data privacy." Proceedings of the 24th ACM International on Conference on Information and Knowledge Management. 2015, pp. 1021-1030. (Year: 2015).*

* cited by examiner

*Primary Examiner* — Kari L Schmidt
(74) *Attorney, Agent, or Firm* — Lowenstein Sandler LLP

(57) ABSTRACT

A system for context-based data privacy can include a processor in communication with a data store associated with a data variable, wherein the data variable is associated with an entity. The processor can receive a request for the data variable. The processor can obtain contextual data associated with at least one of the data variable and the entity. The processor can determine a probabilistic model based on the contextual data. The processor can generate a key for the data variable. The processor can generate a perturbation value by applying the probabilistic model using the key. The processor can send a de-identified value by modifying a current value of the data variable by the perturbation value responsive to the request for the data variable.

20 Claims, 12 Drawing Sheets

FIG. 10

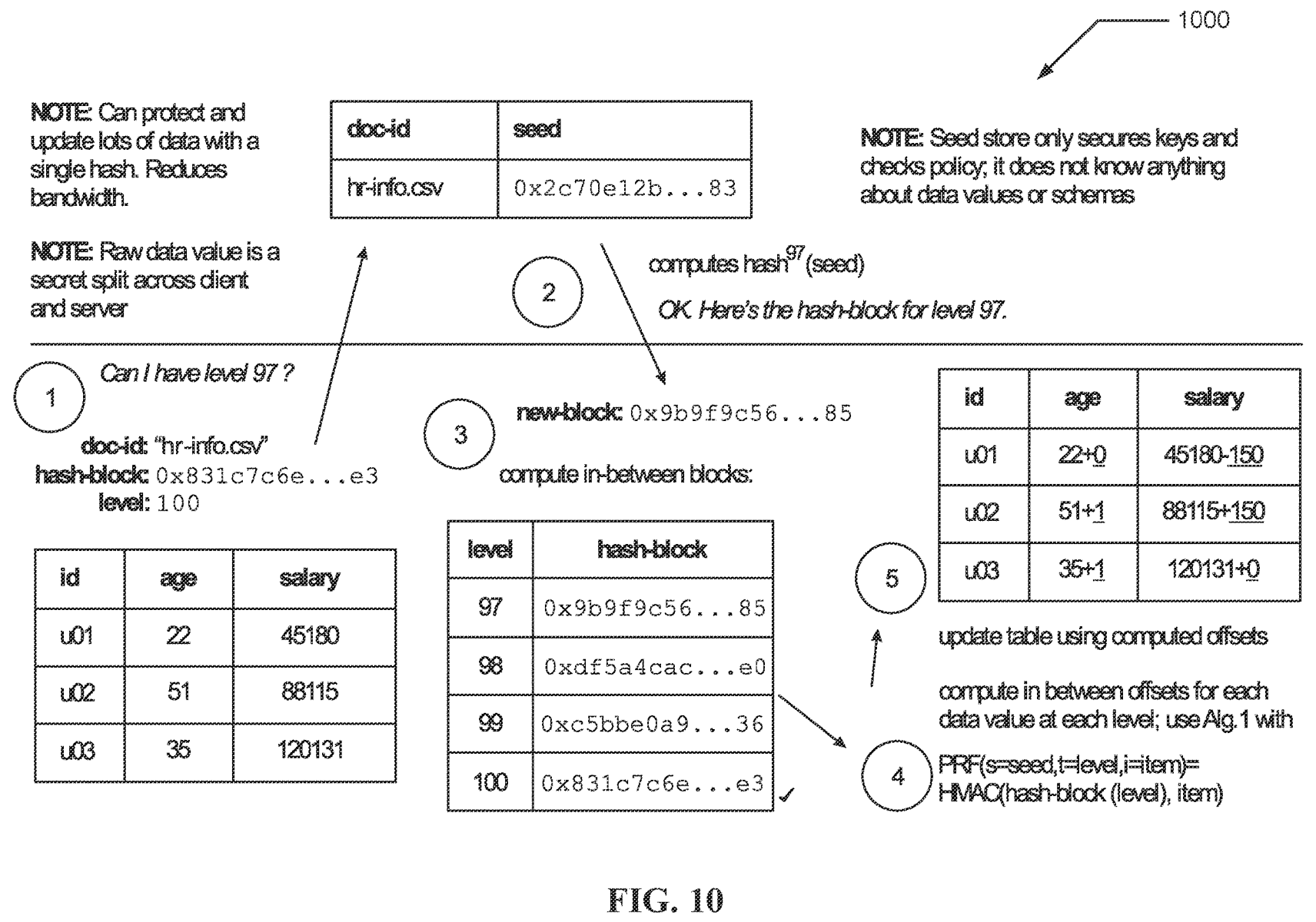

NOTE: Seed store only secures keys and checks policy; it does not know anything about data values or schemas NOTE: Can protect and update lots of data with a single hash. Reduces bandwidth.

NOTE: Raw data value is a secret split across client and server

① Can I have level 97?
doc-id: "hr-info.csv"
hash-block: 0x831c7c6e...e3
level: 100

| id | age | salary |
|----|-----|--------|
| u01 | 22 | 45180 |
| u02 | 51 | 88115 |
| u03 | 35 | 120131 |

| doc-id | seed |
|--------|------|
| hr-info.csv | 0x2c70e12b...83 |

② computes hash⁹⁷(seed)
OK Here's the hash-block for level 97.

new-block: 0x9b9f9c56...85

③ compute in-between blocks:

| level | hash-block |
|-------|------------|
| 97 | 0x9b9f9c56...85 |
| 98 | 0xdf5a4cac...e0 |
| 99 | 0xc5bbe0a9...36 |
| 100 | 0x831c7c6e...e3 |

④ PRF(s=seed, l=level, i=item)= HMAC(hash-block(level), item)

⑤ update table using computed offsets compute in-between offsets for each data value at each level; use Alg.1 with

| id | age | salary |
|----|-----|--------|
| u01 | 22+0 | 45180−150 |
| u02 | 51+1 | 88115+150 |
| u03 | 35+1 | 120131+0 |

CONTEXT-BASED ENTROPY MANAGEMENT

TECHNICAL FIELD

The present systems and processes relate generally to context-specific data privacy.

BACKGROUND

De-identification refers to modifying data to prevent the data from revealing a person's identity and/or other personal identifiable information. For example, data produced during research trials may be de-identified to preserve the privacy of research subjects. As another example, biological data may be de-identified prior to public release in order to comply with health regulations that define and stipulate patient privacy laws. As yet another example, purchase data may be de-identified to allow companies to determine consumer purchase trends while protecting consumer privacy. Previous approaches to de-identification commonly rely on modifying the identifiable portions of an original data value. However, such techniques may be vulnerable to re-identification attacks. For example, in systems that randomly generate value modifications, an attacker may iteratively query the value of a data variable to generate various modified values for a particular data variable analyze the various values to gain a more accurate estimate of the original data value. Previous approaches to differential privacy typically remain vulnerable to re-identification attacks or severely limit the utility of the de-identified data.

Therefore, there is a long-felt but unresolved need for secure, context-based de-identification systems and processes.

BRIEF SUMMARY OF THE DISCLOSURE

Briefly described, and according to one embodiment, aspects of the present disclosure generally relate to systems and processes for secure, context-based de-identification.

In various embodiments, a contextual privacy system can de-identify data for use by various parties, thereby rendering the data unlinkable to an individual or entity with which the data is associated. Among other changes, the contextual privacy system can de-identify data by introducing entropy to data values. The introduction of entropy to a data value can prevent a user from using the data to uniquely identify an individual from which the data was originally derived. The contextual privacy system can preserve global and local data privacy while preserving data utility. In various embodiments, the contextual privacy system provides a consistent format for applying, removing, and auditing perturbation values across all datasets. The contextual privacy system can return consistent responses to data queries, thereby limiting information leakage and mitigating statistical privacy attacks.

The contextual privacy system can de-identify data at varying levels of privacy context, thereby providing a tunable de-identification solution. The contextual privacy system can de-identify data by applying a perturbation value to the data. At a lower privacy context, the contextual privacy system introduces a perturbation value with greater entropy. At a higher privacy context, the contextual privacy system introduces a perturbation value with lesser entropy. In one example, to de-identify an age data variable value, the contextual privacy system applies a perturbation value in the range of +/−10 years for a public privacy context, +/−5 years for a private privacy context, +/−3 years for a confidential privacy context, and +/−0 years for a restricted privacy context. The contextual privacy system can represent privacy context as privacy privilege levels. The contextual privacy system can analyze and assign a query, a query-associated user, a query-associated computing device, and/or a query-associated data variable to a particular privacy privilege level. The contextual privacy system can perform de-identification according to a probabilistic model that corresponds to a probabilistic distribution of the data being de-identified. The contextual privacy system can execute the probabilistic model on an arbitrary bitstring input to generate a perturbation value (e.g., referred to herein as an "offset" or "entropy" value). The contextual privacy system can apply the offset value to the original data to generate de-identified data. At each privacy privilege level, the contextual privacy system can generate offset values based on a stochastic methodology that minimizes data leakage of the differential privacy schema (e.g., thereby preventing statistical privacy attacks that attempt to overcome de-identification by querying data values at the same or varying privacy privilege levels).

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 10 shows an exemplary perturbation sequence, according to one embodiment of the present disclosure.

DETAILED DESCRIPTION

Figure 1A:
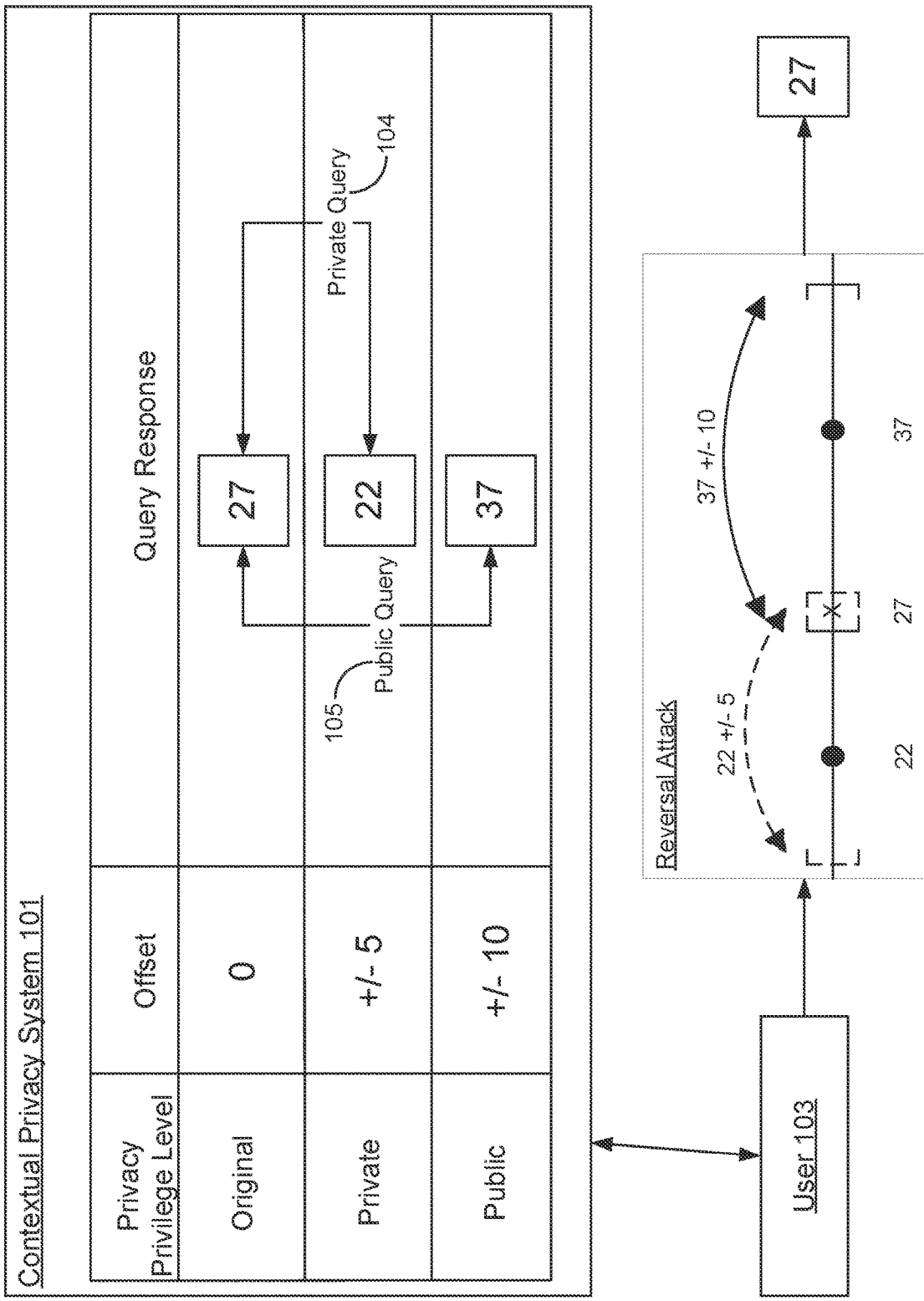
FIG. 1A shows an exemplary de-identification technique, according to one or more embodiments of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As used herein, "offset" refers to a perturbation value that may be applied to a value of a data variable.

Overview

Aspects of the present disclosure generally relate to systems and processes for obfuscating or removing links between data and the individual(s) with whom the data is initially associated (e.g., referred to herein as "data de-identification"). Further, aspects of the present disclosure relate to de-identifying data on a differential privacy basis such that the data may be de-identified to varying extents based on a context of the data, a requestor thereof, and/or the request for the data.

Exemplary Embodiments

Figure 1B:
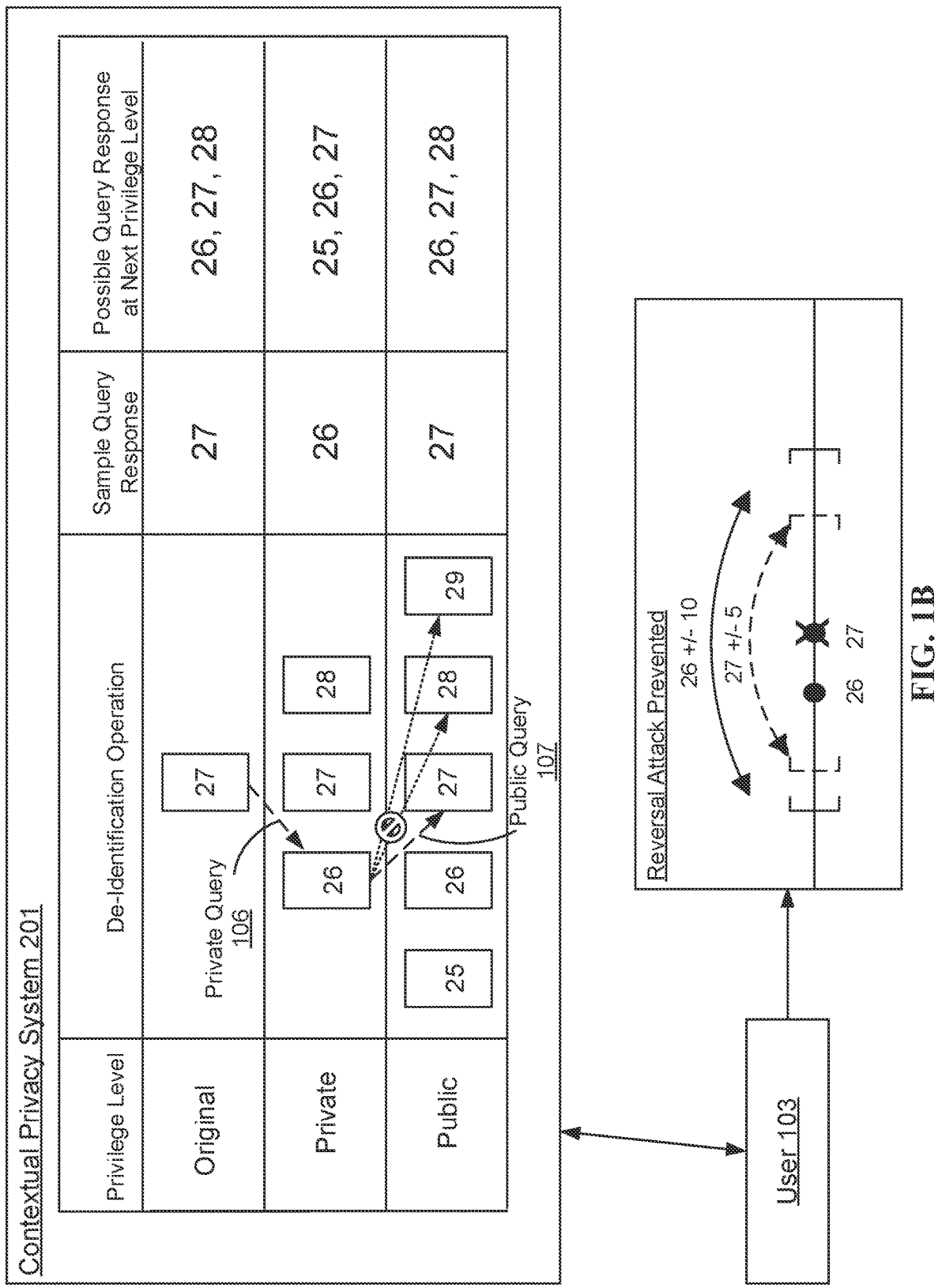
FIG. 1B shows an exemplary de-identification technique, according to one or more embodiments of the present disclosure.

Referring now to the figures, for the purposes of example and explanation of the fundamental processes and components of the disclosed systems and processes, reference is made to FIGS. 1A-B, which illustrate exemplary de-identification techniques according to various approaches (see FIGS. 1A and 1B). As will be understood and appreciated, the exemplary techniques shown in FIGS. 1A and 1B represents merely one approach or embodiment of the present system, and other aspects are used according to various embodiments of the present system. For the purposes of describing exemplary aspects of the present systems and processes, FIGS. 1A-B are presented in the context of de-identifying age variables. It will be understood and appreciated that no limitation of function or purpose is intended by the proceeding description. As will become apparent, the systems and processes described herein may be used to de-identify any sensitive information including, but not limited to, location, time, date, biometric representations and identifiers, age, gender, ethnicity, religion, marital status, household composition, family composition, education, major, income, equity, job title, place of work, health and medical information, and political affiliation.

FIG. 1A shows an exemplary technique for de-identifying data as performed by a contextual privacy system 101 according to various embodiments of the present disclosure. The contextual privacy system 101 can include a data store that stores a data set of ages associated with a plurality of individuals. By iteratively querying the data set at the same or varying privacy privilege level, a user 103 may determine the exact age of each of the plurality of individuals (e.g., by computing a mean of returned values and generating guesses as to the true value based thereon). For example, if the offsets are generated per query, then repeatedly querying reveals the value (e.g., queries for x=10 with offsets +/−5 could return {11, 5, 12, 6, 12, 14, 8, . . . }, which has mean 9.7 so an attacker can easily guess x=10). To prevent exact identification of individuals associated with the stored ages, the contextual privacy system 101 implements a de-identification schema of automatically applying a deterministic offset to an original age value prior to its transmission to the user. The offset value can be intended to prevent the user from immediately identifying the exact age of a particular individual. However, a potential weakness of this de-identification schema is that the user 103 may repeatedly query the dataset at the same or varying privacy privilege levels to obtain a set of offset age values that can be collectively analyzed to reverse engineer the offset and reveal the original age value. In one example, we assume a user possesses knowledge of the offset range at a public privacy privilege level and a private privacy privilege level. In this example, the user may defeat the de-identification protection by: a) querying a data variable at each privilege level, b) plotting the offset-adjusted data variable values and possible ranges thereof, and c) determining the original value of the data variable by identifying an overlapping value in the plot of data variable values and ranges associated with each privacy privilege level.

In the contextual privacy system 101, the user 103 can transmit a private query 104 associated with a private privacy privilege level and a public query 105 associated with a public privacy privilege level. The contextual privacy system 101 can generate each offset independently at each privacy privilege level (e.g., the offset value generated for a query at the private privacy privilege level has no influence on the offset value generated for a query at the public privacy privilege level, and vice versa). The contextual privacy system 101 can a) in response to the private query 104, apply an offset of +/−5 years to the original age value, and b) in response to the public query 105, apply an offset of +/−10 years to the original age value. Further, it is assumed that the user 103 has prior knowledge of the offset ranges of each privacy privilege level and/or is capable of iteratively querying the age data set at each privacy privilege level to estimate the magnitude of each offset range. In other words, the user 103 possesses knowledge that the private query 104 may result in an offset adjustment of +/−5 years and the public query may result in an offset adjustment of +/−10 years. In response to the private query 104, the contextual privacy system 101 returns an offset-adjusted age value of 22 years. In response to the public query 105, the contextual privacy system 101 returns an offset-adjusted age of 37 years. Knowing the corresponding offset ranges, the user 103 determines that 27 years is the only possible value from which each offset-adjusted age value may be generated, thereby revealing the true age of the particular individual and defeating the de-identification schema of the contextual privacy system 101.

FIG. 1B shows an exemplary technique for de-identifying data as performed by a contextual privacy system 201 according to various embodiments of the present disclosure. The contextual privacy system 201 improves over the above-described flaws of the contextual privacy system 101 shown in FIG. 1A and described herein. The contextual privacy system 201 may eliminate such flaws by computing offset values at each privacy privilege level on a probabilistic and dependent basis such that offset values at successive privacy privilege levels do not provide sufficient information for re-identifying the original value of the data variable. The dependent generation of successive offset values as described herein may prevent a user from using offset-adjusted data variable values to re-identify original data variable values.

FIG. 1B shows a technique for de-identifying data as performed by an embodiment of the contextual privacy system 201 shown in FIG. 2 and described herein. The contextual privacy system 201 can include a data store that includes a data set of ages associated with a plurality of individuals. To prevent exact identification of individuals associated with the stored ages, the contextual privacy system 201 applies an offset value to an original age value prior to its transmission to the user. The contextual privacy system 201 generates the offset value based on a privacy privilege level with which the age variable, the user 103, and/or the query thereof is associated. In at least one embodiment of the contextual privacy system 201, the user 103 is capable of transmitting a private query 106 associated with a private privacy privilege level and a public query 107 associated with a public privacy privilege level.

The contextual privacy system 201 can determine the offset value at each privacy privilege level by using a one-way function to generate an offset value from a probabilistic distribution of offset values (e.g., the probabilistic distribution of offset values being based on a probabilistic distribution of the stored ages). In at least one embodiment, the one-way function includes a secure cryptographic hash function. The contextual privacy system 201 can determine the offset value at each privacy level by iteratively "stepping" from a current offset value to one of: a) the same value of the current offset value, b) an offset value one increment above the current offset value, or c) an offset value one increment below the current offset value. The stepwise schema of offset value generation may correspond to a discrete-time Markov chain. The contextual privacy system 201 can generate each step based on a probabilistic model (e.g., a probabilistic model based on the probabilistic distribution of the data variable being de-identified). By implementing this schema, the range of offset values that may be generated contextual privacy system 201 at a first privacy privilege level are fully contained within the range of offset values that may be generated at a second privacy privilege level. Thus, by this schema, the contextual privacy system 201 may prevent iterative query-based re-identification attacks from determining the exact original value of a data variable with 100% certainty.

The contextual privacy system 201 can generate each offset at each privacy privilege level in a dependent manner (e.g., the offset value generated for a query at the private privacy privilege level has direct influence on the possible offset value generated for a query at the public privacy privilege level). The contextual privacy system 201 can a) in response to the private query 106, apply an offset of +/−5 years to the original age value, and b) in response to the public query 107, apply an offset of +/−10 years to the original age value. Further, it is assumed that the user 103 has prior knowledge of the offset ranges of each privacy privilege level and/or is capable of iteratively querying the age data set at each privacy privilege level to estimate the magnitude of each offset range. In response to the private query 106, the contextual privacy system 201 returns a first offset-adjusted age value of 26 years. In response to the public query 107, the contextual privacy system 201 a) randomly determines a step from the first offset-adjusted age value, and b) executes the step to generate a second offset-adjusted age of 27 years. As shown in FIG. 1B, the contextual privacy system 201 may prevent the generation of an offset value that is greater than one increment away from the previous offset value. Accordingly, in some embodiments, even if the user 103 is aware of the offset ranges of each privacy privilege level, the contextual privacy system 201 does not provide the user 103 with sufficient information for re-identifying the original age value with 100% certainty.

Figure 2A:
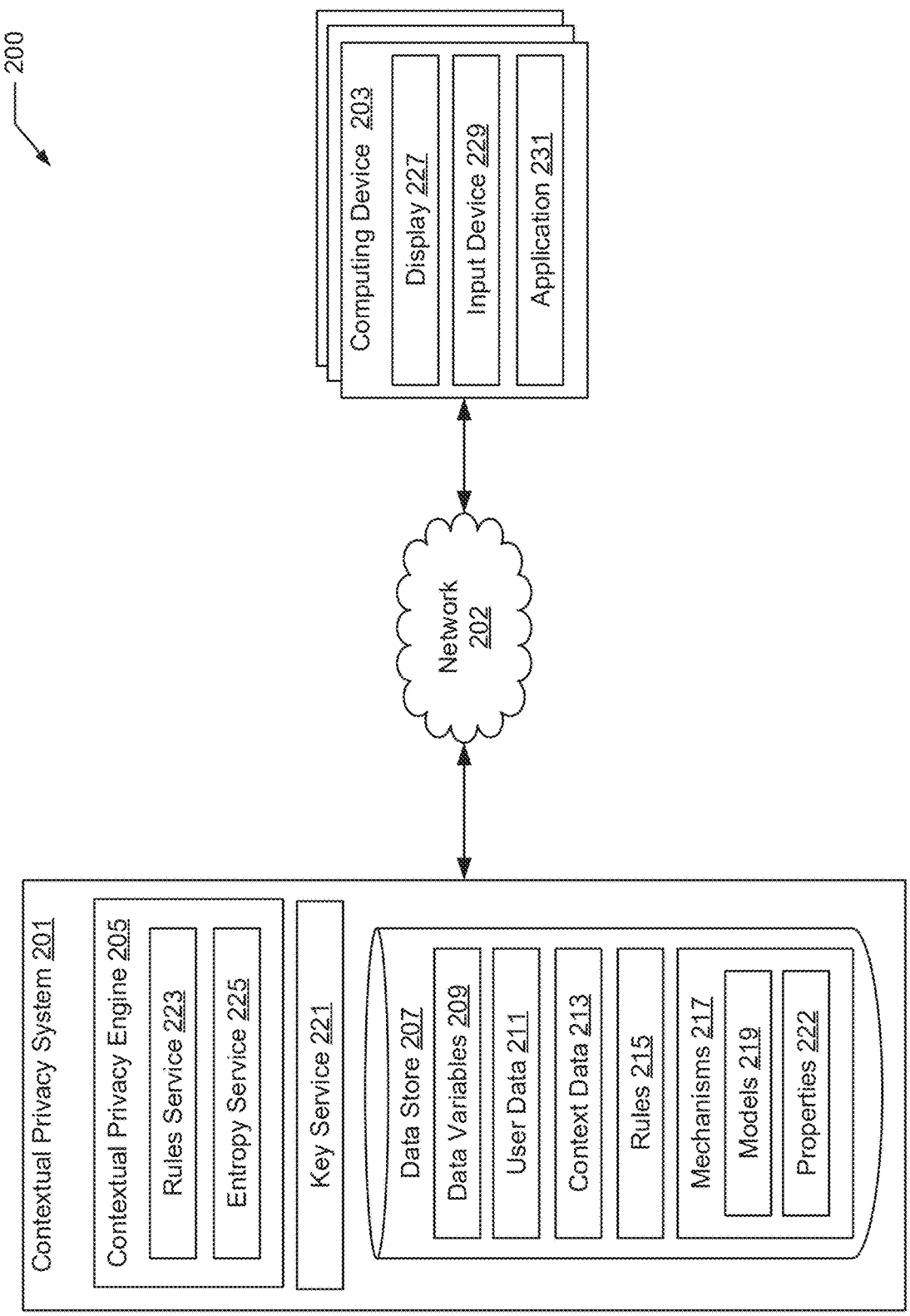
FIG. 2A shows an exemplary networked environment in which the present contextual privacy system may operate, according to one embodiment of the present disclosure.

FIG. 2A shows an exemplary networked environment 200 in which an embodiment of the contextual privacy system 201 may operate. In one or more embodiments, the networked environment 200 includes the contextual privacy system 201 and one or more computing devices 203. In various embodiments, the contextual privacy system 201 can communicate with the computing device 203 over one or more networks 202. The network 202 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks.

The contextual privacy system 201 can include, but is not limited to, a contextual privacy engine 205, one or more data stores 207, and a key service 221. The contextual privacy system 201 includes, for example, a Software as a Service (SaaS) system, a server computer, or any other system providing computing capability. Alternatively, the contextual privacy system 201 may employ computing devices that may be arranged, for example, in one or more server banks or computer banks or other arrangements. Such computing devices can be located in a single installation or may be distributed among many different geographical locations. For example, the contextual privacy system 201 can include computing devices that together may include a hosted computing resource, a grid computing resource, and/or any other distributed computing arrangement. In some cases, the contextual privacy system 201 can correspond to an elastic computing resource where the allotted capacity of processing, network, storage, or other computing-related resources may vary over time. Various applications and/or other functionality may be executed in the contextual privacy system 201 according to various embodiments. In some embodiments, the key service 221 is an external system that can communicate with the contextual privacy system 201.

The contextual privacy engine 205 can include, but is not limited to, a rules service 223 and an entropy service 225. The rules service 223 can generate context-based determinations for controlling data privacy processes described herein. The entropy service 225 can generate offset values and apply offset values to data variables to generate offset-adjusted variable values. Additional description of exemplary embodiments and aspects of the rules service 223 and the entropy service 225 are described herein and, in particular, following the below description of the data store 207.

Various data is stored in the data store 207 that is accessible to the contextual privacy system 201. In some embodiments, the data store 207, or a subset of data stored thereat, is accessible to the computing device 203. The data store 207 can be representative of a plurality of data stores 207 as can be appreciated. The data stored in the data store 207, for example, is associated with the operation of the various applications and/or functional entities described below. The data store 207 can include, but is not limited to, data variables 209, user data 211, context data 213, rules 215, and mechanisms 217.

The data variable 209 can include any set of information for which de-identification may be desired. The data variable 209 can include integer values, floating point values, character values, string values, Boolean values, or any combination thereof. Non-limiting examples of data variables 209 include personal identifiable information (PII), demographic data sets (e.g., age, location, sex, ethnicity, etc.), health records, census data, communication records (e.g., phone logs, email conversations, text messages, etc.), voting records, purchase and other transaction records, asset ownership records and account summaries (e.g., deeds of ownership, outstanding debt, bonds, etc.), Internet and/or other network activities, and social media activities. In one example, the data variables 209 include responses to census surveys. In another example, the data variables 209 include genetic sequences from a plurality of individuals. In another example, the data variables 209 include facial scans and/or feature data derived therefrom. In another example, the data variables 209 include political opinion selections. In another example, the data variables 209 include purchase data from a plurality of customer accounts associated with a merchant.

One or more data variables 209 can include, or be contained within, particular data, such as a text file or a media file. The particular data can include one or more fields in which data variable values are stored. In one example, the data store 207 stores a word document that includes data variables 209 for age, political party alignment, and proximity to a particular location. In another example, the contextual privacy system 201 receives a census spreadsheet file from a computing device 203 and stores the census spreadsheet file at the data store 207. In this example, the census spreadsheet file includes data variables 209 for average household incomes, average household size, and sex of household occupants.

In various embodiments, the variables 209 include variables within machine learning models, such as nodes within a neural network. Non-limiting examples of variables within machine learning models include input nodes, hidden nodes, output nodes, projection dimensions, lot size, learning rate, step size, batch size, mini-batch size, gradient clipping norm, noise level, regularization parameter(s), convexity, smoothness, radius of hypothesis space, number of passes through input data, and training set size. In one or more embodiments, the contextual privacy engine 205 generates models 219 with nodes perturbed at lower privacy levels that may better support text prediction, interpretation of language requests and intents (e.g., search queries), advertising, personalization, and purchases preferences, and facial recognition.

The user data 211 can include, but is not limited to, credentials (e.g., passwords, usernames, etc.), privacy privilege assignments, indications of entity associations and affiliations, name, age, sex, locations, positions and titles, background information (e.g., employment record, legal record, disciplinary history, security clearances, etc.), device information, and contact information. Device information can include, but is not limited to, device identifier, serial number, IP address, MAC address, WiFi address, device type, network provider, and customer account number. Contact information can include, but is not limited to, first name, last name, legal name, nicknames, email addresses, social media profiles, telephone numbers, and physical addresses. In some embodiments, context data 213 includes user data 211. For example, the contextual privacy system 201 receives a request from a user for a value of a particular data variable 209. Continuing the example, the rules service 223 processes user data 211 that is associated with the user and determines that the user is assigned to a public privilege level (e.g., for purposes of viewing or accessing the particular data variable 209). In this example, the rules service 223 may consider the user's public privilege level assignment as context data 213 for the purposes of determining an offset-adjusted value of the data variable 209 that will be provided to the user.

Context data 213 can include any information that may be associated with one or more data variables 209. Further, the context data 213 can generally refer to any information, or additional information derived therefrom, that may control or affect the extent to which the contextual privacy system 201 de-identifies a value of a data variable 209. In other words, the context data 213 includes any information that may affect an extent to which the contextual privacy system 201 adjusts a data variable value prior to its communication to a user and/or a computing device 203. In some embodiments, the context data 213 includes user data 211. The context data 213 can include, for example, an indication of privacy privilege associated with one or more data variables 209 (e.g., public, private, personal identifiable information (PII), confidential, restricted, etc.). The context data 213 can include any metadata with which a data variable 209 may be associated. The context data 213 can include data or metadata associated with particular data that includes one or more data variables 209.

Non-limiting examples of the context data 213 include metrics describing data variable values (e.g., range, median, mode, average, sample size, etc.), indications for indexing data variable values (e.g., row, column, and other header or field information), indications one or more data types with which a data variable 209 is associated, indications for an author of data variable 209 and/or particular data associated therewith, indications for one or more entities with which data variable 209 and/or particular data is associated, one or more privacy privilege levels with which the particular data is associated, timestamps corresponding to the generation, modification, or communication of the data variable 209 and/or particular data associated therewith, and indications for an intended recipient or audience of the data variable 209 and/or particular data associated therewith (e.g., a government agency, the general public, a research institution, etc.). For example, the context data 213 includes row and column headers for indicating one or more data types with which a data variable 209 is associated. In another example, a data variable 209 includes a set of ages. In this example, context data 213 associated with the data variable 209 includes a sample size of the set (e.g., 100, 1,000, 1 million, or any suitable number of samples) and a geographical source of the set (e.g., a particular city, state, region, country, etc.).

The context data 213 can include indications for one or more probability distributions with which a data variable 209 is associated, or indications for the same. The probability distribution can refer to any discrete, continuous, mixed, joint, or non-numeric distribution, or combinations thereof. Non-limiting examples of discrete distributions include binomial, Boltzmann, Poisson, discrete uniform, and degenerate. Non-limiting examples of continuous distributions include beta, exponential, Marchenko-Pastur, uniform, Irwin-Hall, triangular, reciprocal, von Mises, chi-squared, gamma, Pareto, Laplace, normal, logistic, and Bates. Non-limiting examples of mixed distributions include rectified Gaussian and compound Poisson-gamma. Non-limiting examples of joint distributions include Dirichlet, Balding-Nichols, multinomial, Marshall-Olkin, Wishart, matrix normal, and multivariate normal. An exemplary non-numerical distribution is a categorical distribution.

In one or more embodiments, the rules service 223 can analyze one or more data variables 209 and determine one or more distributions demonstrated thereby. For example, the contextual privacy engine 205 analyzes a dataset of emergency room admission records and determines that the emergency room admission records (e.g., or a subset thereof) demonstrate a Poisson distribution. In another example, the contextual privacy engine 205 receives a data variable set and an indication that the data variable set includes information on genetic variations amongst a population. Continuing the example, based on the indication, the contextual privacy engine 205 determines that the data variable set is associated with a Balding-Nichols distribution. In some embodiments, the contextual privacy system 201 receives, from a computing device 203, an indication of a distribution with which a data variable is associated. In at least one embodiment, the contextual privacy system 201 can a) receive indications of distributions with which data variables 209 are associated, and b) store the indications at the data store 207.

The rules 215 can include any rule, policy, or threshold for use in controlling and configuring functions and services of the contextual privacy system 201. Non-limiting examples of rules 215 include associations between data variables 209 and probabilistic distributions, associations between data variables 209 and mechanisms 217, associations between data variables 209 (e.g., and/or mechanisms 217) and one or more privacy privilege levels, and thresholds for monitoring and controlling de-identification requests and request responses. In one example, a rule 215 for a particular data variable 209 provides an association between a first set of user accounts and a public privacy privilege level, an association between a second set of user accounts and a private privacy privilege level, and an association between a third set of user accounts and a restricted privacy privilege level. In another example, a rule 215 includes an association between requests received from a public Wi-Fi network and a public privacy privilege level. In the same example, a second rule 215 includes an association between requests received from a particular private Wi-Fi network and a restricted privacy privilege level. In this example, the public privacy privilege level is associated with a first mechanism 217 that can generate offsets within a first range, and the restricted privacy privilege level is associated with a second mechanism 217 that can generate offsets within a second range that falls within the first range.

In another example, a rule 215 includes a) a meter that is incremented each time a request is received for a particular data variable 209 from a particular computing device 203 and at a particular privacy privilege level, and b) a threshold that, once met, prevents the contextual privacy system 201 from generating additional offset values for de-identifying the particular data variable 209. Continuing the example, the rules service 223 receives a request for an offset-adjusted value of the particular data variable 209 and determines that the request is from the particular computing device and associated with the particular privacy privilege level. In the same example, the rule service 223 increments the meter and determines that the value of the meter meets the threshold. Continuing the example, in response to the determination, the rule service 223 causes the entropy service 225 to retrieve a historical offset-adjusted value of the data variable 209 at the particular privacy privilege level. In this example, the contextual privacy system 201 transmits the historical offset-adjusted value to the sender of the request (e.g., instead of generating and sending a new offset-adjusted value of the data variable 209).

The rules 215 can include any suitable techniques or algorithms for a) processing particular data and identifying data variables 209 therein, b) analyzing user data 211, context data 213, and other information for purposes of controlling and configuring de-identification processes described herein (e.g., such as determining a mechanism 217 for generating offset values), and c) determining a probabilistic model with which a data variable 209 is associated. The techniques and/or algorithms can include, but not limited to, keyword matching, natural language processing (NLP), and supervised, semi-supervised, or unsupervised machine learning and/or artificial intelligence models (e.g., dynamic programming, neural networks, decision trees, random forest classifiers, principal component analysis, etc.).

A mechanism 217 refers to a randomized function, technique, and/or algorithm for mapping datasets to an arbitrary set of outputs. For example, a mechanism 217 includes an algorithm that takes, as input, a distribution of offset values and a random bitstring (e.g., a key generated by the key service 221). Continuing the example, to generate an output, the algorithm selects a particular offset value from the distribution of offset values based on the random bitstring. The mechanisms 217 can include, but are not limited to, models 219 and properties 222. The models 219 can include probabilistic models of offset values, referred to herein as "distributions" of offset values. Non-limiting examples of the distributions include binomial, Boltzmann, Poisson, discrete uniform, degenerate, beta, exponential, Marchenko-Pastur, uniform, Irwin-Hall, triangular, reciprocal, von Mises, chi-squared, gamma, Pareto, Laplace, normal, logistic, Bates, rectified Gaussian, compound Poisson-gamma, Dirichlet, Balding-Nichols, multinomial, Marshall-Olkin, Wishart, matrix normal, multivariate normal, and categorical.

Each mechanism 217 can be associated with one or more data variables 209. Further, each mechanism 217 can be associated with a particular privilege level that defines a level of specificity with which a value of a data variable may be accessed or viewed. At greater privilege levels, a data variable value can be returned with a greater specificity. For example, at greater privilege levels, the entropy service 225 applies a lower offset, or no offset, to the original data variable value prior to its presentation to a user. At a highest privilege level, a data variable value may be returned with exact specificity (e.g., no offset is applied to the original data variable value). At lower privilege levels, a data variable can be returned with a lower specificity. For example, at lower privilege levels, the entropy service 225 applies a greater offset to the original data variable value prior to its presentation to a user.

In an exemplary scenario, a first, second, and third mechanism 217 are each associated with an age data variable. The first mechanism 217 is associated with a "public" privilege level, the second mechanism 217 is associated with a "private" privilege level, and the third mechanism 217 is associated with a "restricted" privilege level. In accordance with each respective privilege level, the first mechanism can return an offset value +/−10 years, the second mechanism 217 can return an offset value of +/−5 years, and the third mechanism 217 can return an offset value of +/−1 year.

The properties 222 can specify offset value ranges and the magnitudes of increments between offset values in each offset value range. The properties 222 can include offset values that were previously generated by the entropy service 225. The entropy service 225 can retrieve offset values stored in the properties 222. The entropy service 225 can utilize stored offset values (e.g., or keys for seeding generation of the same) to prevent users from repeatedly viewing or accessing multiple variations of an offset-adjusted data variable value.

For example, the contextual privacy system 201 determines that a particular request for a data variable value is identical to or functionally equivalent to a previous request for the same data variable value. In this example, instead of generating and transmitting a new offset-adjusted data variable value, the entropy service 225 a) determines a particular mechanism 217 that is associated with the previous request and the data variable, and b) retrieves a previously generated offset value from the properties 222 of the particular mechanism 217. Continuing the example, the entropy service 225 applies the previously generated offset value to the original data variable value and the contextual privacy system 201 transmits the offset-adjusted data variable value to a computing device 203 with which the particular request is associated.

The key service 221 can generate random bitstrings referred to as "keys" that are used by the entropy service 225 as an input to one or more mechanisms 217. In some embodiments, the keys generated by the key service 221 can also be used to support cryptographic functions, such as, for example, digital authentication, digital signatures, AES encryption and other suitable encryption schemas. The key service 221 can generate a key based one or more key generation algorithms, techniques, or combinations thereof. The key service 221 can generate a key according to one or more parameters, such as, for example, data type, privacy privilege level, key length or dimension, key (a) symmetry, nonce injection or concatenation, and key shares (e.g., in a distributed key generation framework). The key service 221 can configure key generation operations based on a particular mechanism 217 to which keys will be provided. For example, the key service 221 uses a first key generation algorithm for a first mechanism 217 and uses a second key generation algorithm, different from the first key generation algorithm, for a second mechanism 217. The key service 221 can configure key generation operations based on a probabilistic distribution with which the particular mechanism 217 or data variable 209 is associated. In scenarios of de-identifying information from a plurality of fields in particular data, the key service 221 can generate the same key or a different key for each field.

The keys generated by the key service 221 can provide consistent randomness to offset generation systems and processes described herein. For example, the key service 221 generates a key and, in response to a first request, the entropy service 225 executes a particular mechanism using the key. Continuing the example, based on the key, the mechanism pseudorandomly samples a distribution of offset values and returns a particular offset value as output. In the same example, in response to a second request that is identical to the first request, the entropy service 225 receives the key from the key service 221, executes the mechanism based on the key, and returns the particular offset as output.

The key service 221 can generate or retrieve keys based on one or more of user data 211, context data 213, and rules 215. In an exemplary scenario, the contextual privacy system 201 receives identical requests from a first user and a second user, the requests for a value of a particular data variable 209. The rules service 223 applies rules 215 to user data 211 associated with each user and to the context data 213 associated with the requests and the particular data variable 209. Based on the application of rules 215, the rules service 223 determines that the first user is associated with a "public" privilege level and the second user is associated with a "private" privilege level." The key service 221 generates a first key for generating a response to the first request and a second key, different from the first key, for generating a response to the second request. The entropy service 225 executes a first "public" mechanism using the first key and executes a second "private" mechanism using the second key, thereby generating respective first and second offset values. The entropy service 225 generates a first public output and a second private output by applying, respectively, the first and second offset values to the value of the particular data variable 209. The contextual privacy system 201 transmits the first offset-adjusted value to the first user and transmits the second offset-adjusted value to the second user. In an alternative scenario, the key service 221 generates the same key in response to the first and second requests (e.g., the key generating different outputs based on execution with the first public mechanism or the second private mechanism).

The key service 221, entropy service 225, or application 231 can extend or stretch a key via an extendable output function (e.g., XOF) or a key derivation function. An extendable output function can refer to cryptographic hashing functions that output an arbitrarily large number of random-looking bits based on an input (e.g., a key). The key service 221, entropy service 225, or application 231 can shorten a bitstring via any suitable truncation technique or algorithm.

In some embodiments, the key service 221 generates keys according to one or more embodiments described in U.S. Pat. No. 9,224,000, filed Jun. 14, 2012, entitled "SYSTEMS AND METHODS FOR PROVIDING INFORMATION SECURITY USING CONTEXT-BASED KEYS," or U.S. Pat. No. 9,608,810, filed Feb. 5, 2016, entitled "SYSTEMS AND METHODS FOR ENCRYPTION AND PROVISION OF INFORMATION SECURITY USING PLATFORM SERVICES," the disclosures of which are incorporated herein by reference in their entireties.

The rules service 223 can determine a level of privacy with which a data variable value may be reported in response to a request. The rules service 223 determines a type of offset that may be applied to a data variable 209. For example, the rules service 223 determines that a first request for an annual income value is associated with a public privacy privilege level and a second request for the annual income value is associated with a private privacy privilege level. Continuing the example, the rules service 223 determines that a) a response to the first request must include the value of annual income with an applied offset of +/−10%, and b) a response to the second request must include the value of annual income with an applied offset of +/−5%.

The rules service 223 can process a request for a value of a data variable 209 and determine a mechanism 217 that will be executed by the entropy service 225 to return an offset-adjusted value of the data variable 209 (e.g., or, in some embodiments, an offset for application to the original value of the data variable 209). The rules service 223 can analyze data variables 209, user data 211, and/or context data 213 to perform various functions including, but not limited to, identifying a mechanism 217 for use in de-identifying data variable values and identifying data variables 209 within particular data (e.g., a word document, spreadsheet, or other file). In various embodiments, the rules service 223 configures de-identification processes such that a value of a data variable 209 is only revealed at a particular privacy level to which the requestor of the data variable 209 has been granted or for which the data variable 209 or requestor has been qualified.

In an exemplary scenario, the rules service 223 receives a request from a computing device 203 for a value of an age variable. The rules service 223 determines that the age variable is associated with a public mechanism 217 configured for generating age offsets of +/−10 years, a private mechanism 217 configured for generating age offsets of +/−5 years, and a restricted mechanism 217 configured for generating age offsets of +/−2 years. To determine which of mechanism will be utilized for de-identifying the age variable, the rules service 223 analyzes context data 213 associated with the request (e.g., requestor identity, privilege level of the requestor, historical request activity of the requestor, etc.) and/or associated with the age variable (e.g., sample size, privacy level, historical reporting of the age variable, etc.). The rules service 223 determines that a user account associated with the computing device 203 is assigned to a public privilege level and, in response, determines that the public mechanism 217 is to be used for de-identifying the value of the age variable prior to its transmission to the computing device 203.

In at least one embodiments, the rules service 223 (e.g., and/or the application 231) can process particular data, identify one or more data variables 209 therein, and determine one or more mechanisms 217 by which the entropy service 225 will de-identify each of the one or more data variables 209. The rules service 223 can process the particular data by applying one or more rules 215, which may include keyword matching processes, NLP processes, and/or machine learning or artificial intelligence processes.

In another exemplary scenario, the rules service 223 receives a request to de-identify a word document including a plurality of fields. The rules service 223 processes the word document and determines a subset of the plurality of fields that include data variables 209. For each field in the subset, the rules service 223 determines a mechanism 217 to be used for de-identifying each data variable 209 included in the field (e.g., if there are different types of data variables 209 in a single field, the rules service 223 determines a different mechanism 217 for each type of data variable 209). Thus, for each data variable 209 in the word document, the rules service 223 may determine a level of privacy with which the data variable 209 is associated and, based thereon, a mechanism 217 for use in generating an offset value by which the data variable 209 is adjusted.

To determine the mechanism 217, the rules service 223 can analyze a request for a data variable 209, the data variable 209, user data 211 associated with the request, and context data 213 associated with the request, the sender of the request, and/or the data variable 209. In some embodiments, a request for a value of a data variable 209 includes an indication of a probabilistic distribution with which the data variable 209 is associated. For example, the rules service 223 parses a request and determines that a requested data variable 209 is associated with a binomial distribution. Continuing the example, the rules service 223 determines a privacy privilege level with which the request is associated and identifies a mechanism 217 that is associated with binomial distributions and the privacy privilege level. The rules service 223 can apply one or more rules 215 to one or more of the request, data variable 209, user data 211, and context data 213. In one example, the rules service 223 receives a request from a computing device 203. Continuing the example, the rules service 223 applies a whitelist policy to a serial number of the computing device 203 and determines that the computing device 203 is associated with a public privacy privilege level. In another example, the rules service 223 applies a network policy to metadata of a request and determines that the request was transmitted via a particular private network. Continuing the example, based on the determination, the rules service 223 classifies the request as being associated with a restricted privacy privilege level. In another example, the rules service 223 identifies a particular user account from which a request originated. In this example, the rules service 223 determines that the particular user account is assigned to a list of approved super users. Continuing the example, the rules service 223 classifies the request as being associated with a restricted privacy privilege level.

The rules service 223 can determine a type of reply that will be provided in response to a request. The rules service 223 can determine whether a request response is to include an offset-adjusted data variable value, the offset value itself, or both. For example, the rules service 223 receives a de-identification request from a computing device 203 and determines that the de-identification request is for generating and returning offset values that will be applied by the computing device 203 to a set of data variables 209. Continuing the example, the rules service 223 determines a mechanism 217 for use in generating the offset value of each of the set of data variables 209.

The rules service 223 can restrict data variable request responses to stored offset values (e.g., or keys for seeding generation of the same), thereby preventing users from repeatedly viewing or accessing multiple variations of an offset-adjusted data variable value. For example, the rules service 223 can determine that a request for the value of a data variable 209 is identical, or functionally equivalent, to a previously received data variable request. Continuing the example, in response to the determination, the rules service 223 causes the entropy service 225 to retrieve, from the data store 207, a previously generated, offset-adjusted value of the data variable 209 (e.g., the retrieved value being associated with the previously received request). Alternatively, in this example, the rules service 223 causes the entropy service 225 to retrieve, from the data store 207, or receive, from the key service 221, a key that is associated with the previously received request. Continuing the alternative example, the entropy service 225 applies a model 219 to the key and, thereby, generates the previous offset-adjusted value of the data variable 209.

The entropy service 225 can generate offset values that may be applied to a data variable 209 (e.g., for purposes of de-identifying a value of the data variable 209). The entropy service 225 can generate offset values based on determinations from the rule service 223, aspects of a data variable request, and/or user commands. The entropy service 225 can generate offset values according to a privacy privilege level with which a request is associated. The privacy privilege level can refer to a privacy privilege level of a user, the user's computing device 203, the data variable 209 associated with the request, or the network 202 through which the request was received or through which a response to the request will be transmitted. In various embodiments, the entropy service 225 applies an offset to a value of a data variable 209 and returns an offset-adjusted value of the data variable 209. In some embodiments, the entropy service 225 outputs one or more offset values for storage at the data store 207 and/or subsequent transmission to a computing device 203 or other source of a data variable request.

The entropy service 225 can generate an offset value by executing a mechanism 217 with a random bitstring input. The entropy service 225 can a) generate a probabilistic distribution of offset values based on a model 219 (e.g., and, in some embodiments, one or more properties 222), and b) pseudorandomly select a particular offset value from the probabilistic distribution based on the arbitrary bitstring input. In some embodiments, the input bitstring is a pseudorandom secret or nonrandom secret, such as a password. In one or more embodiments, the output offset is indistinguishable from random to ensure privacy protection. In various embodiments, the entropy service 225 generates the same offset value when using the same random bitstring as an input to the same mechanism 217 (e.g., using the same random bitstring input for the same mechanism 217 will result in the same offset value output). The entropy service 225 can use the same input bitstring for different mechanisms 217 and obtain different offset values from each mechanism 217. In one example, a first privacy privilege level is associated with offset values of +/−5 years and a second privacy privilege level is associated with offset values +/−10 years. In this example, while each privacy privilege level is associated with a different mechanism 217, the entropy service 225 can use the same input bitstring as an input to each mechanism 217 (e.g., the first mechanism 217 generating an offset between +/−5 years and the second mechanism 217 generating an offset between +/−10 years).

In another example, a document includes a plurality of fields and each of the plurality of fields includes a plurality of data variables 209 of dissimilar type and/or privilege level (e.g., each data variable 209 is associated with a different mechanism 217). Continuing the example, the key service 221 generates a different input bitstring for each of the plurality of fields. In this example, for each of the plurality of fields, the entropy service 225 uses the same input bitstring as an input to the mechanism 217 associated with each data variable 209 in the field.

The arbitrary input bitstring can include a key that is generated by the key service 221. The entropy service 225 can receive or retrieve the key from the key service 221, the data store 207, or the computing device 203. In one example, the entropy service 225 determines that a data variable 209 is associated with a normal distribution and retrieves a mechanism 217 that includes a model 219 and properties 222 that are associated with normal distribution. In the same example, the entropy service 225 receives a key from the key service 221 and uses the key as an input to the model 219. Continuing the example, the entropy service 225 generates an offset value and applies the offset value to an original value of the data variable 209 (e.g., or to another offset-adjusted value of the data variable 209). In at least one embodiment, the offset values generated by the entropy service 225 are referred to as "perturbation values."

The entropy service 225 can store offset values, offset-adjusted data variable values, and/or keys at the data store 207. The entropy service 225 can store offset values, offset-adjusted data variable values, and/or keys in association with the data variable 209 for which they were generated. The entropy service 225 can store the offset values, offset-adjusted data variable values, and/or keys in association with user data 211 (e.g., a particular user, or set of users) or context data 213 (e.g., a particular privacy privilege level, entity affiliation, etc.).

Figure 2B:
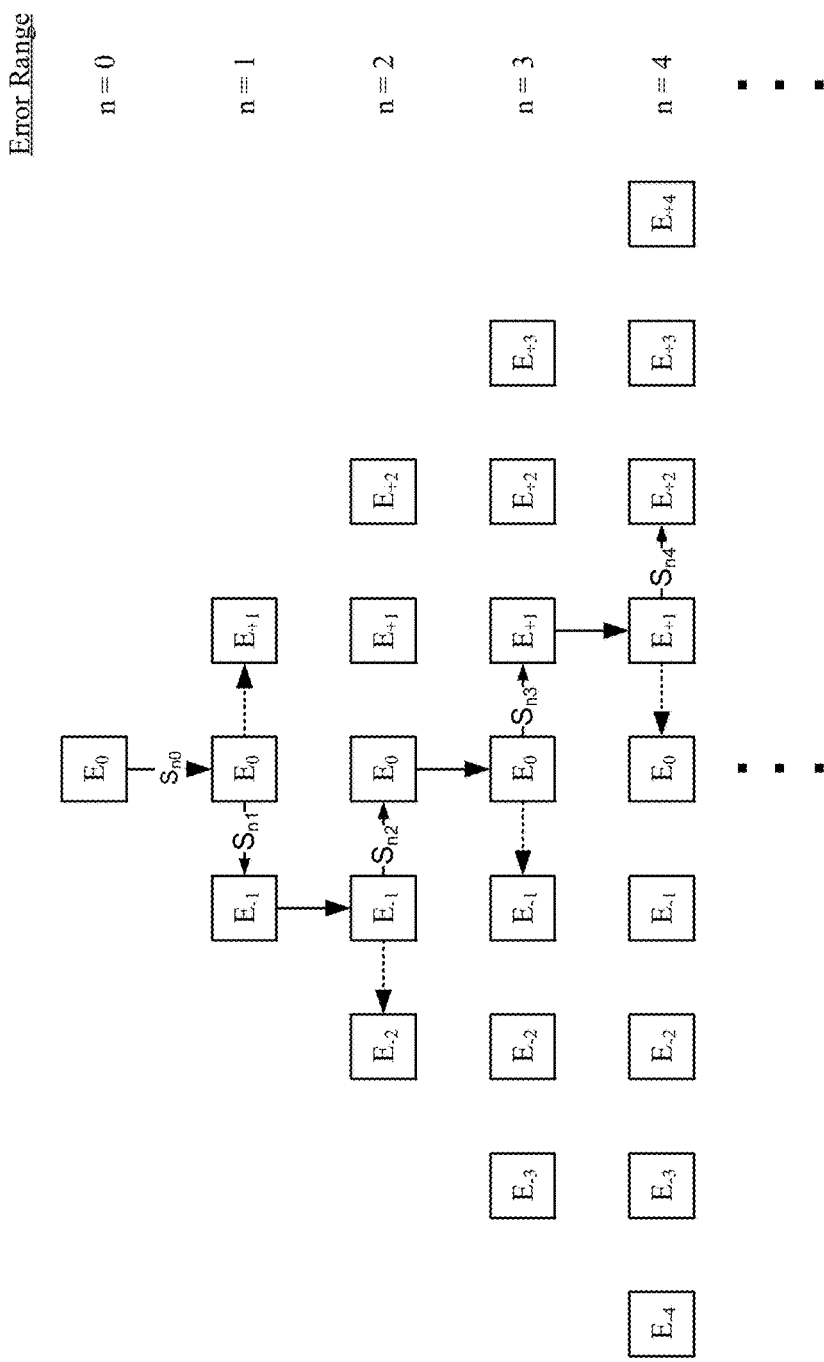
FIG. 2B shows an example privacy-secured schema, according to one embodiment of the present disclosure.

The entropy service 225 can generate offset values according to a privacy-secured schema. FIG. 2B describes an example privacy-secured schema 252, referred to herein as Schema 1 252, which, in some embodiments, corresponds to a discrete-time Markov chain. In various embodiments, as used in Schema 1, E refers to an offset value. For example, $E_0$ can refer to an initial offset value that is randomly sampled from a distribution of offset values. In the same example, $E_{+1}$ can refer to an offset value obtained by sampling the offset value one step above $E_0$ in the distribution (e.g., if $E_0$ equals 1.0 and the distribution increments by 2.0, then $E_{+1}$ equals 3.0) and $E_{-1}$ can refer to an offset value obtained by sampling the offset value one step below $E_0$ in the distribution (e.g., if $E_0$ equals 1.0 and the distribution increments by 2.0, then $E_{-1}$ equals −1.0). In one or more embodiments, as used in Schema 1 252, S refers to an increment (referred to as a "step") for transitioning from a first value of E to a second value of E. For example, as shown in Schema 1, $S_{n1}$ is a step from $E_0$ to $E_{-1}$, $S_{n2}$ is a step from $E_{-1}$ to $E_0$, $S_{n3}$ is a step from $E_0$ to $E_{+1}$, and $S_{n4}$ is a step from $E_{+1}$ to $E_{+2}$. In at least one embodiment, S is randomly determined by the entropy service 225 based on a mechanism 217 that includes a probabilistic model of potential values of offset E (e.g., which may itself be based on a distribution of the data variable 209 to which the offset E is to be applied). In one or more embodiments, as used in Schema 1, n refers to a range of values of E. According to one embodiment, each successive n fully contains the values of E present at the previous n. In other words, by generating offset values according to Schema 1, the smaller offset intervals necessarily lie within larger offset intervals.

The entropy service 225 can generate S according to mechanisms 217 that are based on the probabilistic distribution of the data variable 209 to which the offset E is to be applied. Equation 1 provides an algorithm of an exemplary mechanism 217 that may be used for data variables 209 that are associated with a normal or Gaussian distribution. Note that the continuous normal distribution can be constructed approximated by the discrete binomial distribution via Binomial (n,p)→Normal (n p, n p (1−p)). When n is large, in particular for X~Binomial (2t, ½), X→Normal (t, t/2) and X−t→Normal (0, t/2). Since the normal distribution is linear, the larger t is, the more precise and accurate the approximation (e.g., under certain circumstances, a binomial distribution may converge in probability to a normal distribution and one can be used to approximate the other). Further, the entropy service 225 can calibrate the error term (e.g., offset value) by using a suitable scaling function $f: \mathbb{N} \to \mathbb{R}$. The error term at time t for a key x may be represented by $E_t(x)$ initiating from $E_0(x)=0$ for all x. For example, the entropy service 225 selects $f$ such that $t*f(t)^2 \to 0$ as $t \to 0$. In various embodiments, as used in Equation 1, x refers to a random bitstring, such as a key from the key service 221. In at least one embodiment, as used in Equation 1, r refers to an error range (e.g., n range of E in Schema 1). Exemplary outputs of Equation 1 are provided below in Output 1, the properties of which may hold for $E_t$ generated for any secret x.

Compute independent pseudorandom samples $s_1(x)$, $s_2(x), \ldots, s_r(x)$ derived from x such that $s_t(x) \sim$ Uniform $[0,3]$ for each $1 \leq t \leq r$.

Compute the dependent errors recursively using $\epsilon_0(x)=0$ and the relation $$\epsilon_{t+1}(x) = \begin{cases} \epsilon_t(x) + 1, & \text{if } s_{t+1}(x) = 3 \\ \epsilon_t(x), & \text{if } s_{t+1}(x) = 2 \text{ or } 1 \\ \epsilon_t(x) - 1, & \text{if } s_{t+1}(x) = 0 \end{cases} \quad \text{(Equation 1)}$$

for $0 \leq t < r$.

$\epsilon_1(x), \epsilon_2(x), \ldots, \epsilon_r(x)$ (dependent errors computed from x)

such that for $1 \le t \le r$:

1. 
$$\mathbb{P}[\epsilon_i(x) = k] = \begin{cases} \binom{2t}{t+k} /2^{-2t} & k \in [-t, t] \\ 0 & k \notin [-t, t] \end{cases}.$$

(i.e., errors distributed as X–t with X~Binomial $(2t, \frac{1}{2}))\epsilon_t$

2. $|(x) - \epsilon_{t-1}(x)| \le 1$ where $\epsilon_0(x) = 0$ for all x.

(Output 1)

The computing device 203 can include, but is not limited to, one or more displays 227, one or more inputs devices 229, and an application 231. The display 227 can include, for example, one or more devices such as liquid crystal display (LCD) displays, gas plasma-based flat panel displays, organic light-emitting diode (OLED) displays, electrophoretic ink (E ink) displays, LCD projectors, or other types of display devices, etc. The input device 229 can include one or more buttons, touch screens including three-dimensional or pressure-based touch screens, camera, finger print scanners, accelerometer, retinal scanner, gyroscope, magnetometer, or other input devices. The application 231 can support and/or execute processes described herein, such as, for example, the contextual privacy processes 300 and 400 shown in FIGS. 2 and 3, respectively, and described herein. The application 231 can generate user interfaces and cause the computing device 203 to render user interfaces on the display 227. For example, the application 231 generates a user interface including an original appearance of particular data and a second appearance of the particular data following de-identification of one or more data variables 209 therein.

The application 231 can generate and transmit requests to the contextual privacy system 201. The application 231 can request and receive, from the contextual privacy system 201, offset values, offset-adjusted data variable values, keys or other input bitstrings for generating offset values, original or offset-adjusted metrics that are derived from original or offset-adjusted data variable values (e.g., mean, median, mode, maximum, minimum, ratios, trends, patterns, etc.), and de-identified versions of particular data (e.g., such as de-identified versions of word documents, spreadsheets, etc.). The application 231 can store requests and request responses in memory of the computing device 203 and/or at a remote computing environment configured to communicate with the computing device 203. In some embodiments, the application 231 can apply an offset to an original value of a data variable 209. For example, the application 231 receives or retrieves an original value of a data variable 209 and requests an offset from the contextual privacy system 201 (e.g., for the purpose of de-identifying the original value). Continuing the example, the contextual privacy system 201 generates an offset value based on the data variable 209 and a privacy privilege level with which the application 231 is determined to be associated. In the same example, the application 231 receives the offset from the contextual privacy system 201 and applies the offset to the original value to generate an offset-adjusted value of the data variable 209.

The computing device 203 can be associated with a particular user, user account, and/or entity (e.g., company, agency, party, business, merchant, etc.). The computing device 203 can be associated with contextual data 213 including, but not limited to, a privacy privilege level, a user, a user account, an entity (e.g., company, agency, party, business, merchant, etc.), a physical location (e.g., address, country, city, region, zip code, etc.), a digital location (e.g., a particular network 202, network address, platform, application, web page, etc.), and device configuration (e.g., firmware, software, hardware, serial number, MAC address, IP address, security settings, etc.). The requests transmitted by the application 231 to the contextual privacy system 201 can include, but are not limited to, data variables 209, user data 211, context data 213, rules 215, and mechanisms 217 (e.g., or elements thereof, such as models 219 and/or properties 222). In one example, a request includes an indication of a data variable 209, an indication of a probabilistic distribution with which the data variable 209 is associated, and an indication of ranges and increments of possible offset values that may be applied to the data variable 209 at one or more privacy privilege levels.

Figure 3:
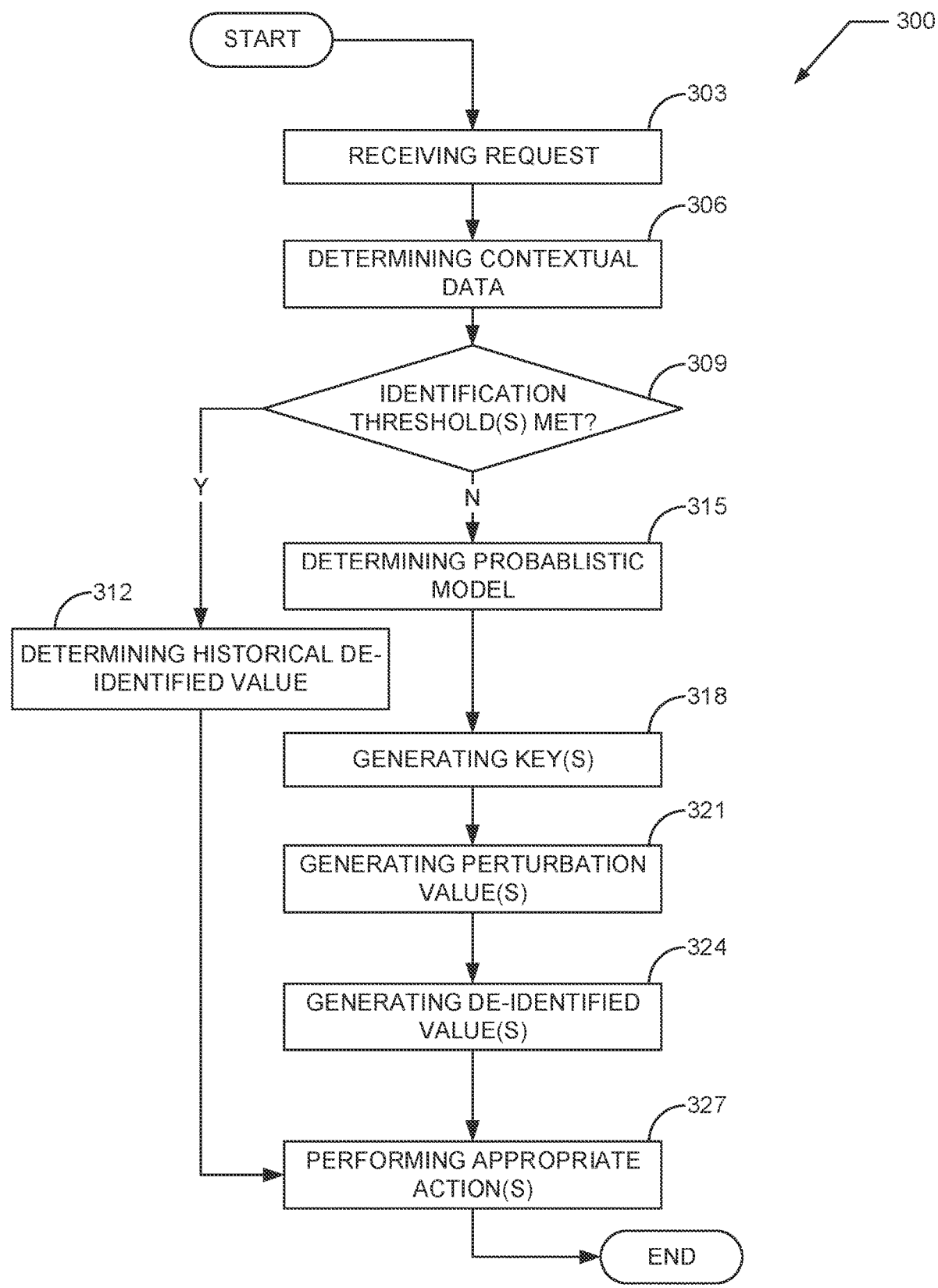
FIG. 3 shows an exemplary de-identification processes, according to one embodiment of the present disclosure.

As will be understood by one having ordinary skill in the art, the steps and processes shown in FIG. 3 (and those of all other flowcharts and sequence diagrams shown and described herein) may operate concurrently and continuously, are generally asynchronous and independent, and are not necessarily performed in the order shown. In at least one embodiment, FIG. 3 illustrates flowchart of a process 300. The process 300 can exemplify a technique for distributing de-identified data variables 209. The process 300 can employ any particular system of the networked environment 200. For example, the process 300 can occur on a single computing device 203, a single contextual privacy system 201, various computing devices 203, various contextual privacy systems 201, or a combination thereof. For example, two computing devices 203 can work together to perform the process 300. In another example, the process 300 can be performed between one computing device 203 and one contextual privacy system 201.

At step 303, the process 300 includes receiving a request for a particular data variable 209 according to one embodiment of the present disclosure. In some embodiments, the data variable 209 is associated with at least one entity. For example, the requested data variable 209 can include ages, names, social security numbers, test grades, among other particular data discussed herein of one or more students in a school. The request for data variables 209 can be performed by one or more computing devices 203. For example, the computing device 203 can request the most recent test scores of a particular math class from the contextual privacy system 201. The computing device 203 can send a request to one or more different computing device 203, the contextual privacy system 201, or a combination thereof. For example, a first computing device 203 can make a request for the particular data variable 209 to both a second computing device 203 and the contextual privacy system 201. The computing device 203 can send the request to the contextual privacy system 201 over the network 202. The contextual privacy system 201 and the computing device 203 can initiate any particular network or encryption protocol to securely transfer requests and data between devices.

At step 306, the process 300 includes determining contextual data 213. For example, the contextual privacy engine 205 can decrypt the request sent by the particular computing device 203 to extract information. For example, the request can include identifiers linking the particular computing device 203 to the request, the requested data variable 209, and the time the request was sent. The contextual privacy engine 205 can compare the extracted information to any particular information stored on the data store 207. For example, the rules service 223 can use the identifier stored in the request to determine the user that is trying to access the data variable 209. In various embodiments, the extracted information from the request is used as the context data 213 for the particular request. Once the requested information is identified, the contextual privacy engine 205 can extract more context data 213 associated with the user, the particular requested data variable 209, and/or any other information that is pertinent to the context data 213. For example, the context privacy system 201 can use the initial extracted context data 213 to search for and identify additional context data associated with the requested data variables 209 and the user of the computing device 203. The context data 213 can include any information useful to the entropy service 225 to determine an offset value for de-identifying the value of the particular requested data variable 209.

At step 309, the process 300 includes determining whether one or more identification thresholds are met. In response to determining that an identification threshold is not met, the process 300 can proceed to step 315. In response to determining that the identification threshold is met, the process 300 can proceed to step 312. In various embodiments, a user or computing device 203 may be capable of querying the value of a data variable 209 at varying levels of privacy privilege. The contextual privacy system 201 can implement identification thresholds to prevent a user from requesting multiple values of a data variable 209 at the same or multiple privacy privilege levels.

The rules service 223 can retrieve one or more identification thresholds from rules 215 with which the requested data variable 209 is associated. Further, the rules service 223 can retrieve a particular identification threshold based on user data 211 and/or context data 213 with which the request, the data variable 209, and/or a request-sending computing device 203 is associated.

In an exemplary scenario, for a particular data variable 209, a user is associated with a first identification threshold and a second identification threshold. The rules service 223 can a) apply the first identification threshold when the user submits a query via a public network 202, and b) apply the second identification threshold when the user submits a query via a private network 202. The contextual privacy system 201 receives a data variable request from the user's computing device 203. The rules service 223 analyzes user data 211 and context data 213 to determine that a) the request is associated with the user, and b) the request was received via the private network 202. In response to the determinations, the rules service 223 retrieves and applies the second identification threshold.

The rules service 223 can retrieve and apply one or more identification thresholds that are defined in rules 215 and associated with one or more data variables 209 (e.g., and/or a particular privacy privilege level, as discussed herein). The identification threshold can refer to a number of instances in which a user, multiple users, or all users may query the value of a data variable 209 and obtain a different de-identified value thereof (e.g., the query being associated with a particular privacy privilege level or, in some embodiments, any privacy privilege level). The identification threshold can limit a number of instances in which the contextual privacy system 201 returns different de-identified values of a data variable 209. The identification threshold can prevent a user from obtaining multiple, different de-identified values of a data variable 209, thereby reducing data leakage. In some embodiments, the identification thresholds restrict each user, or all users, from obtaining more than 1, 2, 3, or any suitable number of de-identified values of a data variable 209.

In an exemplary scenario, in a first instance, the contextual privacy system 201 receives a request from a computing device 203 for a de-identified value of an age data variable. The contextual privacy system 201 de-identifies an original value of the age data variable and transmits a first de-identified age value to the computing device 203. The rules service 223 updates an identification threshold associated with the computing device 203 to indicate that the computing device 203 received the first de-identified age value. Further, the contextual privacy system 201 stores the first de-identified age value and/or a key for re-generating the same de-identified age value from a mechanism 217 with which the age data variable is associated. Continuing the scenario, in a second instance, the contextual privacy system 201 receives a second request from the same computing device 203 for a second de-identified value of the age data variable. The rules service 223 applies the identification threshold and determines that the computing device 203 has already been provided with the first de-identified age value. In response to the determination, instead of generating and transmitting a second de-identified value of the age variable, the contextual privacy system 201 retrieves and re-transmits to the computing device 203 the first de-identified age value. In some embodiments, the rules service 223 can reset an identification threshold based on one or more factors, such as, for example, passage of a time period (e.g., 24 hours, 3 months, 1 year, or any suitable duration) or movement of a computing device 203 into or out of a particular geolocation and/or digital environment.

A plurality of identification thresholds can each be associated with a different privacy privilege level. Each of the plurality of identification thresholds can limit the number of data variable queries to the same or a different number. In one example, the rules 215 for a particular data variable 209 include a public threshold for queries associated with a public privacy privilege level, a private threshold for queries associated with a private privacy privilege level, and a restricted threshold for queries associated with a restricted privacy privilege level. In this example, each identification threshold restricts the contextual privacy system 201 from providing a user with more than one de-identified data variable value at the corresponding privacy privilege level. In various embodiments, identification thresholds are specific to a particular computing device 203 and/or user. For example, for a particular data variable 209, a first computing device 203 is associated with a first identification threshold and a second computing device 203 is associated with a second, separate identification threshold. In this example, a query from the first computing device 203 causes the rules service 223 to increment only the first identification threshold (e.g., the second identification threshold is unaffected by queries from the first computing device 203 and may only be affected by queries from the second computing device 203).

At step 312, the process 300 includes determining one or more historical de-identified values. Once the user reaches their identification threshold, the entropy service 225 can access historical offset values for the requested data variable 209. For example, the historical offset values can be extracted from the rules 215. The entropy service 225 can employ the selected historical offset value to produce a de-identified data variable 209.

At step, 315, the process 300 includes determining one or more probabilistic models. The contextual privacy system 201 can employ the context data 213 to determine a particular probabilistic model associated with the requested data variable 209. For example, the contextual privacy engine 205 can parse through the data store 207 to identify particular probabilistic models associated with the context data 213 and the requested data variable 209. The models 219 can include probabilistic models that are associated with particular data variables 209 and context data 213. For example, a binomial distribution model can be linked to particular grading data of a math class and stored into the models 219. Continuing this example, the contextual privacy engine 205 can use class size data and/or other context data 213 to determine the particular test data requested by the computing device 203. The probabilistic model associated with the test data requested, and/or any other particular data variable 209, by the computing device 203 can be stored by the entropy service 225 for further processing.

At step 318, the process 300 includes generating one or more keys. Generating the key can include retrieving the key from the request made by the computing device 203. In various embodiments, the entropy service 225 can request the key service 221 to generate a key for producing an offset variable. The key service 221 can employ any particular computational algorithms, input variables, and/or situational determination to create a key for the de-identification process. For example, the key service 221 can use the context data 213, the requested data variable 209, and the number of requests made by various users to produce one or more keys. The key service 221 can send the generated key to the entropy service 225. The key service 221 can store the generated key in the data store 207 for future. For example, if two users make identical requests for a particular data variable 209, the key service 221 can create a key according to the request and store the data into the data store 207. For both requests, the entropy service 225 can access the generated key to produce a particular offset variable.

At step 321, the process 300 includes generating one or more perturbation values based on the probabilistic model and the request. The entropy service 225 can use the mechanism 217 with the requested data variable 209, the generated key, the particular probabilistic model, and/or any other pertinent information for determining an offset-variable. For example, based on the request made by the computing device 203, the data variable 209, the context data 213, the rules 215, and/or any other information, the entropy service 225 can select the mechanism 217 and the model 219 that produces the proper offset variable for the requested data variable 209. Continuing this example, the selected mechanism 217 can receive the generated key to produce an offset variable for de-identifying the requested data variable 209. The entropy service 225 can produce or receive the offset variable for integration into the requested data variable 209.

At step 324, the process 300 includes generating one or more de-identified values by applying the one or more perturbation values to original values of one or more data variables (e.g., or to one or more de-identified values thereof). The entropy service 225 can apply the offset variable to the requested data variable 209 by adding, concatenating, embedding, or any other appropriate application. For example, if the entropy service 225 determines an offset variable of positive 3 to a test score of 84 for a request made by the computing device 203, the entropy service 225 can add three points to the test score 84 to create a de-identified test score of 87. In another embodiment, the entropy service 225 can convert the test score into hexadecimal and concatenate the test score with the determined offset variable. In some embodiments, the contextual privacy engine 205 can perform various operations for de-identifying a subset of requested data. For example, the computing device 203 can request a spreadsheet of data related to the financial status of homeowners in a particular region. The spreadsheet can include data related to the average income of each household in a neighborhood. The entropy service 225 can generate and apply offset variables to each income data variable 209 in the spreadsheet. In some embodiments, the entropy service 225 can determine the median, mean, and mode, of the de-identified data and perform a second de-identification of the calculated values. The entropy service 225 can calculate the mean, median, and, mode of the requested data and then apply an offset value to de-identify the calculated data. In various embodiments, the entropy service 225 only de-identifies a particular subset of data in the spreadsheet requested by the computing device 203. In some embodiments, the entropy service 225 does not de-identify the requested data depending on the privacy level of the computing device 203 requesting the information.

At step 327, the process 300 includes performing one or more appropriate actions. The contextual privacy system 201 can send the de-identified data to the computing device 203. In some embodiments, the key service 221 can encrypt the de-identified data prior to sending the data through the network 202. The contextual privacy system 201 can store the de-identified data in the data store 207 and perform analysis on the particular data. For example, the contextual privacy system can employ machine learning algorithms and/or statistical operations to attempt an identification of the original information de-identified by the entropy service 225. Continuing this example, the contextual privacy system 201 can continually review and confirm if the data variables 209 are truly de-identified. In some embodiments, the contextual privacy system 201 can recognize a flaw in the de-identification process and store a report in the data store recognizing the issue. In various embodiments, the contextual privacy system 201 can recognize a fake request for data variables 209 and deny the computing device 203 from receiving any particular information. In another example, the contextual privacy system 201 can store, in the data store 207, a bitstring input and/or hash associated with generating the perturbation value(s) at the corresponding privacy privilege level (e.g., thereby allowing for subsequent retrieval and reuse of the perturbation value). In some embodiments, the rules service 223 includes a hash chain service. In various embodiments, the hashing service generates and stores, in the data store 207, a hash value corresponding to the bitstring input by which a perturbation value was generated.

Figure 4:
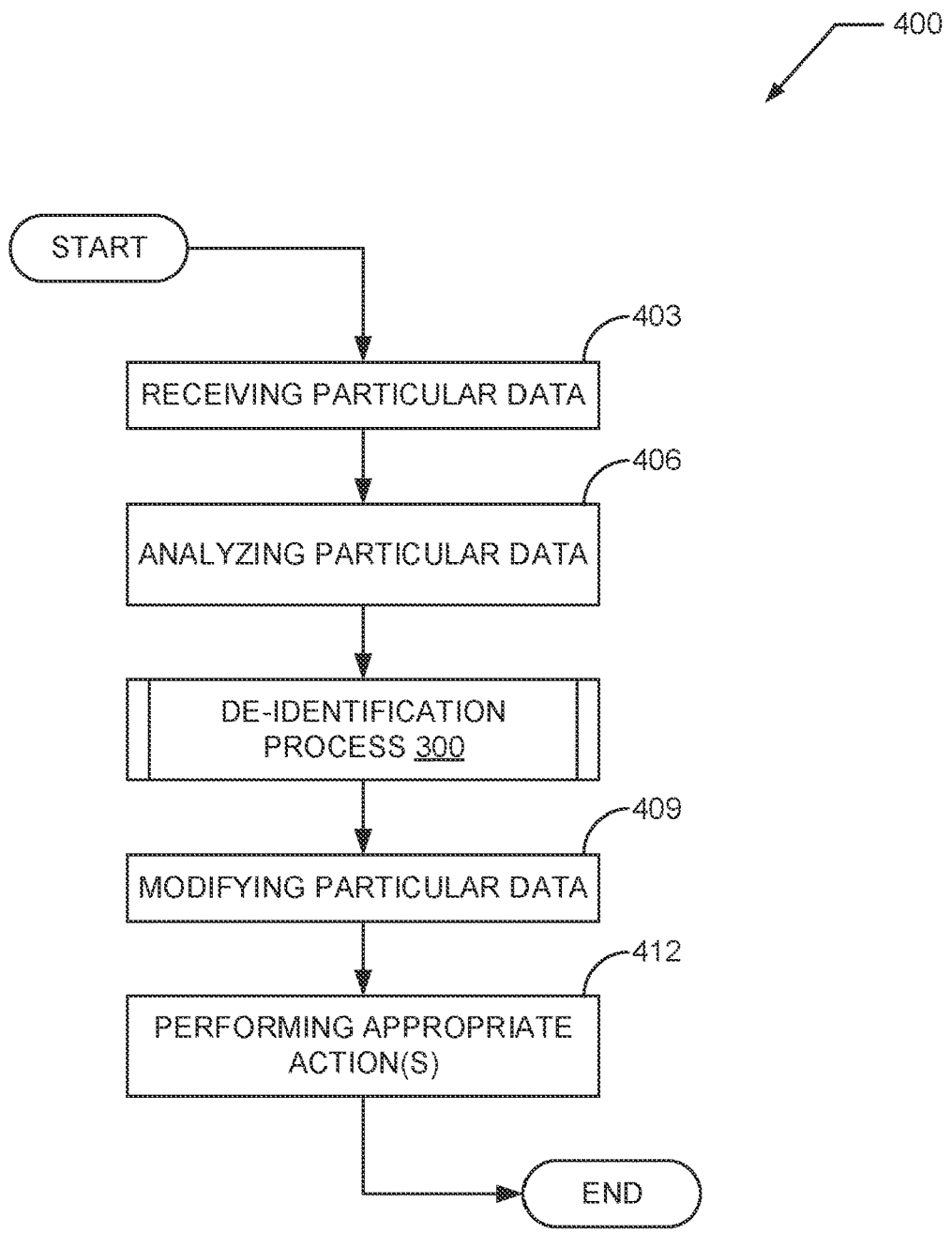
FIG. 4 shows an exemplary de-identification processes, according to one embodiment of the present disclosure.

Referring next to FIG. 4, which illustrates flowchart of a process 400 according to various embodiments of the present disclosure. The process 400 can exemplify a technique for generating a de-identified version of particular data (e.g., a word document, spreadsheet, electronic communication, or other file) by de-identifying one or more data variables 209 within the particular data. The process 400 can employ any particular system of the networked environment 200. For example, the process 400 can occur on a single computing device 203, a single contextual privacy system 201, various computing devices 203, various contextual privacy systems 201, or a combination thereof. In one example, the process 400 can be performed between one computing device 203 and one contextual privacy system 201. In some embodiments, the application 231 of a computing device 203 performs the process 400. For example, the application 231 includes a contextual privacy engine 205 (e.g., in the form of software installed on the computing device 203) and includes or accesses a data store of data variables 209. Continuing the example, the application 231 includes a key service 221 (e.g., or can receive keys from an external key service 221). In the same example, the application 231 can generate de-identified versions of particular data by receiving the particular data, identifying values of one or more data variables 209 therein, and replacing the values with de-identified values of the one or more data variables 209.

At step 403, the process 400 includes receiving particular data, such as, for example, one or more computer files. Non-limiting examples of computer files include word documents, text files, electronic correspondences, spreadsheets, presentation files, and images. The particular data can include data associated with one or more data variables 209, such as a value of a particular data variable 209. In one example, the particular data is a quarterly financial summary that includes data variables of and values for total debt, quarterly revenue, and liquid asset valuation. In another example, the particular data is a medical report for subjects originating from a particular region. In this example, the medical report includes data variables for average subject age, parts-per-million pollution concentration of each subject, and distance of each subject to a point source of pollution.

The application 231 can receive inputs for requesting de-identification of one or more elements of particular data. The application 231 can transmit a request to the contextual privacy system 201 that includes the particular data, indications for the one or more elements, and an indication of a data variable 209 with which each of the one or more elements is associated.

At step 406, the process 400 includes analyzing the particular data. The rules service 223 or application 231 can analyze the particular data via any suitable technique(s) or algorithm(s) including, but not limited to, optical character recognition (OCR), natural language processing (NLP), computer vision, trained machine learning models, and artificial intelligence. The rules service 223 can analyze the particular data by determining one or more fields in the particular data (e.g., each of which may include one or more data variables 209 for de-identification). For example, the rules service 223 processes a document and identifies a plurality of text fields therein via OCR, document metadata, and/or other techniques or algorithms. The rules service 223 can determine if the particular data, or a field thereof, includes a data variable 209. For example, the rules service 223 performs keyword recognition on each of a plurality of fields in a document. Continuing the example, based on keyword matches for "age," "years old," "height," and "measures," the rules service 223 determines a subset of the plurality of fields that include values for an age data variable and/or a height data variable.

The rules service 223 can apply one or more rules 215 to particular data to identify a data type of one or more elements of the particular data. For example, the rules service 223 receives a spreadsheet that includes a plurality of columns and a header for each of the plurality of columns. Continuing the example, the rules service 223 applies a first rule 215 to detect and extract a text string for the header of each column. In the same example, the rules service 223 applies a second rule 215 to associate each header text string with a particular data variable 209 (e.g., based on keyword matching, similarity metrics, predefined policies, etc.).

The rules service 223, or application 231, can generate and cause the computing device 203 to render a user interface that includes the particular data. The rules service 223 can receive selections to the user interface for identifying data variables 209 therein. The rules service 223 can process selections to identify elements of the particular data for which de-identification may be performed. The selection can include an indication of a particular data variable 209 with which the selected element is associated.

Analyzing the particular data can include generating context data 213 based on the particular data. The rules service 223 can retrieve, from the particular data, an indication of privacy privilege level, such as, for example, a text string label, a watermark, or metadata associated with privacy privilege level. For example, the rules service 223 determines that a document includes a "restricted" watermark and associates a data variable 209 therein with a restricted privacy privilege level (e.g., by causing de-identification to be performed via a mechanism 217 that is associated with the restricted privacy level for the data variable 209). In another example, the rules service 223 determines or receives an indication of an intended recipient or audience of the particular data. In another example, the rules service 223 determines one or more authors or contributors of the particular data.

Analyzing the particular data can include determining one or more elements of the particular data or data variables 209 to reserve against de-identification (e.g., thereby preserving the original value of the element). In one example, the particular data includes a data variable 209 of genetic sequences (e.g., a plurality of base pairs and/or other genetic data). In this example, the rules service 223 applies a rule 215 to the genetic sequences to determine one or more sub-sequences thereof that will not be subjected to de-identification processes (e.g., to preserve the genetic information encoded thereby, prevent a misinterpretation of the genetic information, and/or other reasons that will become apparent to one of ordinary skill in the art).

Analyzing the particular data can include determining an offset range for the data variable 209 corresponding to the particular data or the de-identification request associated therewith. For example, rules service 223 parses a de-identification request for a text file, determines a data variable 209 present in the text file, and extracts, from the request, a range of offset values that may be applied to the data variable 209. In another example, the rules service 223 parses a de-identification request for a text file, determines a data variable 209 present in the text file, and determines that the request is associated with a public privacy privilege level. Continuing the example, the rules service 223 identifies a mechanism 217 that is associated with the public privacy privilege level and includes, in properties 222, a particular range of offset values. Analyzing the particular data can include determining a discrete-time Markov chain, or aspects thereof, that will be performed to generate an offset value. Determining the discrete-time Markov chain can include determining a count of iterations based on the range of offset values for the data variable 209. In other words, and referring now to Schema 1, determining the discrete-time Markov chain can include determining a number of steps S and by which the entropy service 225 will sample a particular offset E from a corresponding range n (e.g., n demonstrating the same probabilistic distribution of values as that of the data variable 209). The count of iterations can be determined based on the privacy privilege level associated with the particular data, the data variable 209, and/or the request for the same. For example, at a confidential privacy privilege level, the rules service 223 causes the entropy service 225 to step through two iterations of a discrete-time Markov chain (e.g., each iteration being associated with a particular offset range, wherein successive offset ranges a) expand upon previous offset ranges according to a probabilistic distribution, and b) fully encompass the previous offset ranges). In the same example, at a public privacy privilege level, the rules service 223 causes the entropy service 225 to step through four iterations of the discrete-time Markov chain.

The process 400 can include performing one or more de-identification processes 300. By the process 400, the contextual privacy system 201 and/or application 231 generates an offset value for each data variable 209 of the particular data received at step 403. The rules service 223 can apply a plurality of rules to particular data stored as the data variable 209 (e.g., or that includes the data variable 209) to identify a plurality of fields in the particular data for de-identification (e.g., via adjustment of data variable value by an offset value). The rules service 223 can determine a mechanism 217 for each of the plurality of fields, respectively. The mechanism 217 of each field, or each data variable 209 in the field, can be of the same or different privacy privilege level. The key service 221 can generate a key for each of the plurality of fields. The key service 221 can generate an initial key for the particular data or for each of the plurality fields. The key service 221 can derive an iteration key for each of the plurality of fields or each data variable 209 therein based on the initial key. To generate an offset value for each field or data variable 209 therein, the entropy service 225 executes the mechanism 217 with the corresponding iteration key to generate a current iteration offset value.

In an exemplary scenario, the contextual privacy system 201 receives a request to de-identify a census report from a government agency, the request including a copy of the census report and an indication for a public privacy privilege level. The rules service 223 determines that the census report includes an income data variable, an age data variable, and a home equity data variable. The rules service 223 determines, for each data variable, a mechanism 217 associated with the data variable type and the public privacy privilege level. The entropy service 225 receives one or more keys from the key service 221. The entropy service executes each mechanism 217 with the key to generate an offset value for each of the income data variable, age data variable, and home equity data variable.

At step 409, the process 400 includes modifying the particular data. Modifying the particular data can include applying a respective offset value to each data variable 209 within the particular data. The entropy service 225 can apply one or more current iteration offset values to corresponding data variables 209 located within the current field iteration. Within the particular data, the entropy service 225 can replace field values of the data variables 209 with offset-adjusted data variable values. For example, the particular data includes a plurality of data variable values contained within text strings. In this example, the entropy service 225 can generate and apply an offset to each data variable value to generate a plurality of offset-adjusted data variable values. Continuing the example, the entropy service 225 modifies each text string to replace the original data variable value with the corresponding offset-adjusted data variable value. Modifying the particular data can include computing one or more metrics based on the offset-adjusted values of the data variables 209. For example, the entropy service 225 generates and applies an offset value to each of a plurality of age samples. Continuing the example, the entropy service 225 computes a mean, median, mode, and range of the plurality of age samples based on the offset-adjusted values. In the same example, within particular data that includes the plurality of age samples, the entropy service 225 replaces the field values of each age sample with the corresponding offset-adjusted value and replaces the field values of the mean, median, mode, and range with offset-adjusted values thereof.

In some embodiments, the contextual privacy system 201 does not modify the particular data. For example, the entropy service 225 generates offset values for de-identifying the particular data and the contextual privacy system transmits the offset values to the source from which the request was received.

At step 412, the process 400 includes performing one or more appropriate actions. The contextual privacy system 201 can transmit and/or store offset values, keys for generating the offset values, offset-adjusted data variable values, and/or an offset-adjusted version of the particular data. In one example, the contextual privacy system 201 stores the modified version of particular data, generates a network link from which the offset-adjusted version of the particular data may be downloaded, and transmits the network link to a computing device 203 from which the particular data was received. In another example, the contextual privacy system 201 transmits one or more offset values to the application 231. In this example, the application 231 applies the one or more offset values to corresponding data variables 209 of the particular data, thereby generating an offset-adjusted version of the particular data. The contextual privacy system 201 can transmit de-identification outputs in any suitable format including, but not limited to, text or other document files, .CSV or other spreadsheet files, and electronic mail.

The contextual privacy system 201 or application 231 can generate a user interface that includes an offset-adjusted version of the particular data. The user interface can include, for example, an indication of the privacy privilege level with which the particular data is associated or indications of one or more fields of the particular data for which de-identification was performed.

In some embodiments, the contextual privacy system 201 generates an inline frame ("iframe") that includes the offset-adjusted version of the particular data. For example, a web server receives a user request to view a particular document being stored as a data variable 209 and transmits the request to the contextual privacy system 201. Continuing the example, the contextual privacy system 201 generates an offset-adjusted version of the particular document and hosts the offset-adjusted version of the particular document at a particular network address. In the same example, the contextual privacy system 201 transmits the particular network address to the web server and the web server renders the offset-adjusted version of the particular document by generating an iframe via the particular network address.

Additional Description of Exemplary Embodiments

As discussed herein, developing useful machine learning models and data mining patterns may involve using datasets that contain sensitive information. In at least one embodiment, data perturbation systems and processes shown and describe herein provide privacy for individual attributes while preserving some model features and the usefulness of aggregate statistics of the overall data set. In previous approaches to differential privacy, an a priori privacy budget commitment may inefficiently sacrifice privacy or fail to preserve a feature necessary to successfully complete a statistical task. In various embodiments, the present data perturbation hierarchies may enable Pareto optimizations that more effectively balance privacy against utility. In one or more embodiments, the present systems and processes may perform differential privatization via pseudorandom "walks" for constructing hierarchies of privacy levels such that the information loss between privacy levels is minimized.

Security and access control are commonly based on hierarchical models where public roles are the most restricted and administrators have the least restricted access to a resource. In one or more embodiments, the present systems can generate hierarchical privacy levels for a dataset can by perturbing values into increasing ranges. Knowing that x=u±3 is more useful and less private than x=v±7 for some perturbed values u, v. In various embodiments, a differential privacy solution involving privacy levels may contend with the several problems. A first problem may include resampling. In some embodiments, non-deterministic perturbation resampling leaks information and may render the dataset vulnerable to an attacker. For example, the privacy of probabilistic perturbation generation may be easily overcome by repeatedly generating independent perturbations for a fixed data value. In this example, either a Bayesian analysis or the arithmetic mean of the samples may be used to infer the true value.

A second problem may include intersection. In at least one embodiment, the intersection of independent perturbation ranges may leak information. In one example, the age x of an individual is published as 25±5 and later published as 40±10. Expressed in terms of intervals, this is equivalent to stating $x \in I_1 \cap I_2$ where $I_1=[20, 30]$ and $I_2=[30, 50]$. Even though the interval $I_2$ provides more privacy for x than $I_1$, the overall privacy is completely compromised since $I_1 \cap I_2 = \{30\}$. Generally, if $I_1 \cap I_2 \neq I_1$ or $I_2$ then some amount of privacy is always lost.

Figure 5:
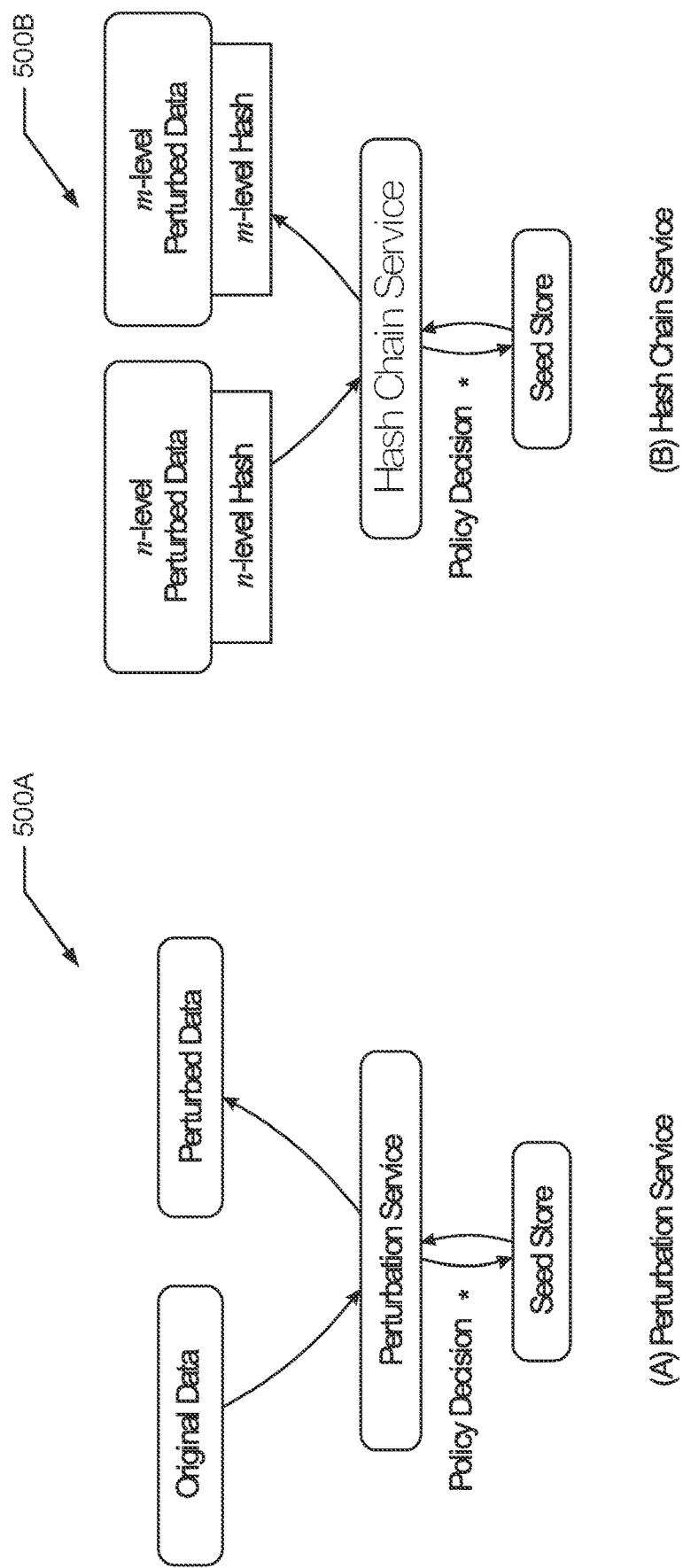
FIG. 5 shows exemplary perturbation workflows for generating perturbation values, according to various embodiments of the present disclosure.

A third problem may include distribution. In one or more embodiments, a major utility of perturbations may be provided by the ability to control perturbation value generation. FIG. 5 shows exemplary perturbation workflows 500A, 500B for generating perturbation values. In at least one embodiment, in the perturbation workflow 500A, the contextual privacy system 201 (e.g., see FIG. 2 and accompanying descriptions) stores most of the original data and performs most or all of the computations for perturbing the data.

In various embodiments, in the perturbation workflow 500B, the computing device 203 (FIG. 2) stores most of the original data. In one or more embodiments, in the perturbation workflow 500B, the contextual privacy system 201 performs a policy check, fetches a key, and computes a block in a hash chain. In at least one embodiment, the computing device 203 uses the computed hash block to perturb the original data to a lower privacy level. In various embodiments, the perturbation workflow 500B may avoid the contextual privacy system 201 knowing anything about the data perturbation models and/or distributions. In at least one embodiment, dashed lines in the perturbation sequence 1000 shown in FIG. 10 may illustrate the division of operations between the contextual privacy system 201 and the computing device 203.

An exemplary scenario may demonstrate the vulnerability of previous differential privacy approaches. In one scenario, consider the case of a randomized response survey for a Yes-No question in which a participant is asked to privately flip a coin and answer truthfully if Heads is flipped and answer "Yes" if Tails is flipped. In this scenario, the consistent probability of coin flipping events may allow an analyst to estimate the quantity of truthful "Yes" responses with some certainty (e.g., potentially causing undesirable data leakage).

As shown and described herein, a solution to the above problems may include a deterministic framework for constructing and maintaining differential privacy hierarchies. In various embodiments, let $\lambda \in \mathbb{N}_0$ be a privacy level. In at least one embodiment, fix a seed s for pseudorandom number generation and compute the sequence of perturbations $\Delta_0(s), \Delta_1(s), \ldots \Delta_\lambda(s)$ where $\Delta_t(s) \in I_t = [-t, t]$ for all $0 \leq t \leq \lambda$. In one or more embodiments, the value x can be protected at privacy level $\lambda$ by publishing $y_\lambda = x + \Delta_\lambda(s)$. In various embodiments, the technique may overcome the problem of resampling via the system performing each step of the perturbation generation "walk" based on a seed input and, thereby causing resampling operations to yields the same perturbation value with every repetition (e.g., at the given privacy level $\lambda$). In at least one embodiment, the technique may overcome the problem of intersection by the fact that, by construction, the steps $I_0 \subset I_1 \subset \ldots I_\lambda$. In one or more embodiments, the technique may overcome the problem of distribution by allowing calibration of the perturbation generation according to a probability distribution with which the data to-be-perturbed is associated.

Figure 6:
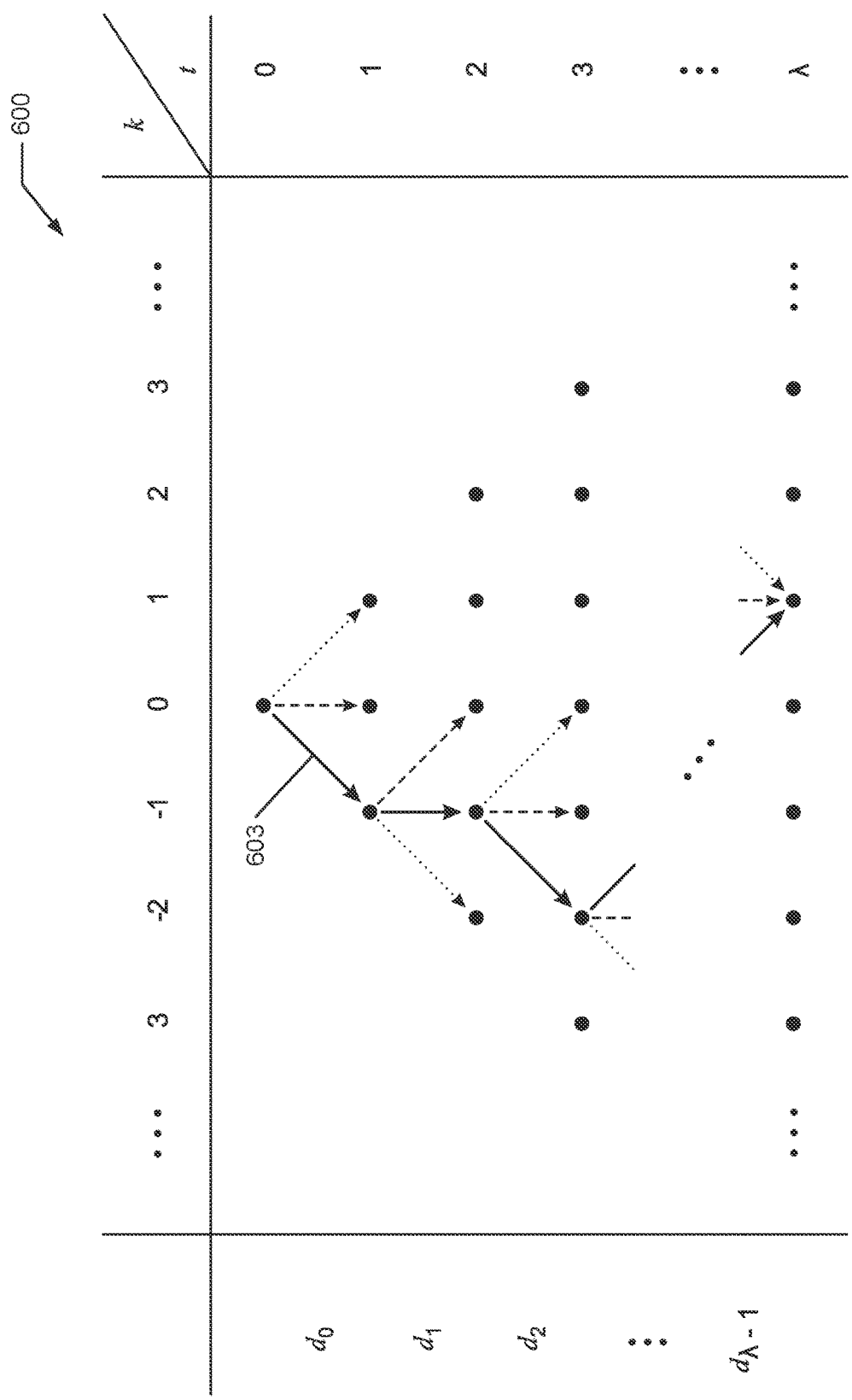
FIG. 6 shows an exemplary perturbation walk, according to one embodiment of the present disclosure.

FIG. 6 shows an exemplary perturbation walk 600. In one or more embodiments, the perturbation walk 600 is based on a seed s. In various embodiments, the perturbation walk 600 shown in FIG. 6 shows a privacy walk from $\Delta_0(s)=0$ to $\Delta_\lambda(s) \in [-\lambda, \lambda]$ with transition steps determined by $d_t \sim U(0,1)$.

In at least one embodiment, the privacy walk 600, based on the seed s, starts at a state $\Delta_0(s)=0$. In one or more embodiments, via the privacy walk 600, the contextual privacy engine 205 iteratively takes unit steps to the left, right, or remains in place based on a state-transition function T(t,k) at time t for the current state k. In various embodiments, as shown in FIG. 6, after $t=\lambda$ steps, the returned perturbation $\Delta_\lambda(s) \in [-\lambda, \lambda]$ can be used to protect a value $x \in \mathbb{R}$ as $y_\lambda = x + \Delta_\lambda(s)$. In one or more embodiments, knowing s, one may invert the process and recover x from $y_\lambda$ by computing $\Delta_\lambda(s)$.

In at least one embodiment, taking s to be a random variable, the privacy walk 600 becomes a stochastic process that can be analyzed as a discrete-time Markov chain. In one or more embodiments, the probability of the privacy walk 600 passing through the state k at time t is given by Equation 2.

$$\mathbb{P}[\Delta_{t+1}=k] = \mathbb{P}[\Delta_{t+1}=k-1]R(t,k-1) + \mathbb{P}[\Delta_t=k]C(t,k) + \mathbb{P}[\Delta_t=k+1]L(t,k+1) \quad \text{(Equation 2)}$$

In at least one embodiment, L(t,k), C(t,k) and R(t,k) are the probabilities of transitioning at time t and state k to the left, center, right, respectively. In one or more embodiments, collectively, L, C, and R determine T. In various embodiments, a careful choice of T can ensure that $\mathbb{P}[\Delta_\lambda=k] = \mathbb{P}[X=k]$ for a discrete variable X of a specified probability distribution with support $k \in [-\lambda, \lambda]$. In one example, setting $L(t,k)=\frac{1}{4}$, $C(t,k)=\frac{1}{2}$, $R(t,k)=\frac{1}{4}$ for all $t \in \mathbb{N}_0$ and $k \in [-t, t]$ yields a zero-centered binomial distribution with the parameter $p=\frac{1}{2}$.

In some embodiments, it may be easier to define T through its cumulative density function. In at least one embodiment, let $b_1(t,k)=L(t,k)$ and $b_2(t,k)=L(t,k)+C(t,k)=1-R(t,k)$. In one or more embodiments, for a uniform sample $d \sim U[0,1]$, it follows by definition that $\mathbb{P}[d<b_1(t,k)]=L(t,k)$, that $\mathbb{P}[b_1(t,k) \leq d \leq b_2(t,k)]=C(t,k)$, that $\mathbb{P}[d>b_2(t,k)]=R(t,k)$, and that $b_1$, $b_2$ can be used to specify T.

In at least one embodiment, the privacy walk 600 includes performing one or more algorithms to generate a perturbation value, such as, for example, Algorithm 1.

(Algorithm 1)

Input : s (seed bitstring),
    λ(privacy level),
    $\mathcal{P}$(probability distribution)
Output: $\Delta_\lambda(s) \sim \mathcal{P}$ (perturbation),
k ← 0 ;
for t ← 0 to λ do
  | r ← PRF (t, s) ;    /* pseudorandom function */
  | d ← float (r) ;    /* cast as decimal 0 ≤ x ≤1 */
  | $b_1$, $b_2$ ← Bounds ($\mathcal{P}$, t, k) ;    /* state-transition conditions */
  | if d < $b_1$ then
  |   | k ← k + 1;
  | else if d > $b_2$ then
  |   | k ← k+1;
  | end
end
return Correction ($\mathcal{P}$, k, r) ;    /* distribution adjustments (optional) */

In various embodiments, a privacy walk is a discrete stochastic process terminating at a state $W_\lambda \in [-\lambda, \lambda]$. According to one embodiment, the interval $[-\lambda, \lambda]$ may not be injectively mapped to the support of some common distributions (e.g., Gaussian, Laplace, exponential, geometric), thereby preventing direct perturbations for these types. In one or more embodiments, embodiment, the contextual privacy engine 205 applies one or more inverse transform sampling methods to extend the privacy assurances to an arbitrary distribution. In at least one embodiment, Let $W_\lambda \sim G$ for some discrete distribution G with pmf g and support $[-\lambda, \lambda]$, and F be a target distribution. In various embodiments, the contextual privacy engine 205 partitions the unit interval as:

$$0 = i_{-\lambda-1} \leq i_{-\lambda} \leq \ldots \leq i_{\lambda} = 1$$

Where $i_k = F^{-1}(G(k))$ for each $k \in [-\lambda, \lambda]$ so that:

$$\mathbb{P}[W_\lambda = k] = g(k) = G(k) - G(k-1) = F(i_k) - F(i_{k-1})$$

is satisfied.

In one or more embodiments, the contextual privacy engine 205 applies the inverse transform sampling technique after mapping each privacy walk for which $W_\lambda = k$ to a corresponding interval $[F(i_{k-1}), F(i_k)] \subseteq [0,1]$. In one or more embodiments, linearly scaling a uniform sample $u \sim U[0,1]$ to the restricted subinterval and inverting yields the perturbation, distributed by F based on the privacy walk $W_\lambda$ (s)=k derived from the seed s:

$$\Delta_\lambda(s) = F^{-1}(F(i_{k-1}) + (F(i_k) - F(i_{k-1}))u) = F^{-1}(G(k-1) + g(k)u).$$

In at least one embodiment, if T is defined so that $W_\lambda \sim P$, the information learned through the perturbation $y_\lambda = x + \Delta_\lambda(s)$ of any $x \in \mathbb{R}$ is:

$$\mathbb{P}[x=k | y_\lambda = x + \Delta_\lambda(s)] = \mathbb{P}[\Delta_\lambda = y_\lambda - k].$$

In one or more embodiments, since $\Delta_\lambda(s) \sim P$, the uncertainty metrics for the distribution P (e.g., variance and entropy) quantify the privacy obtained through perturbation.

Figure 7:
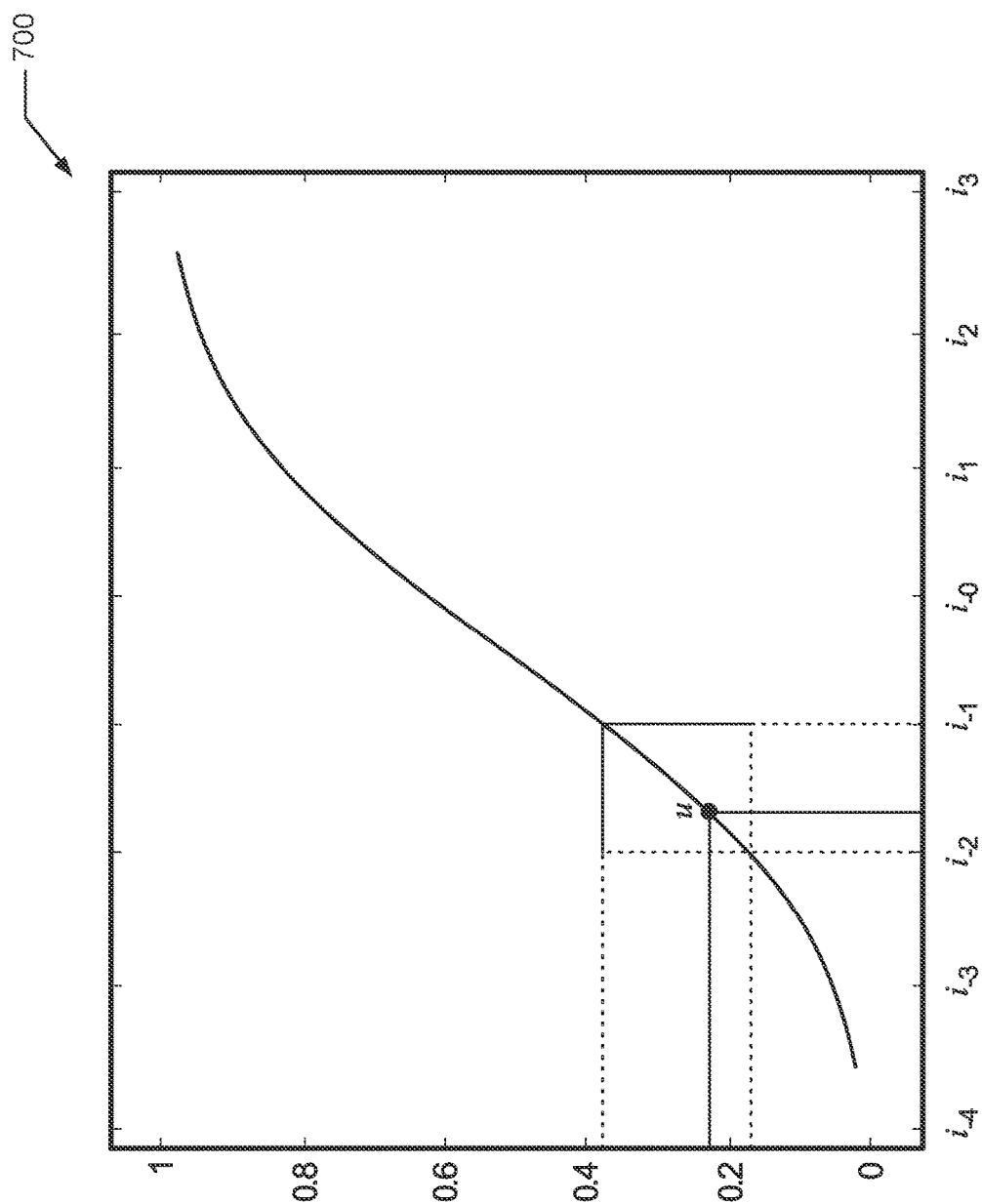
FIG. 7 shows an exemplary perturbation value generated from a perturbation walk partition, according to one embodiment of the present disclosure.

FIG. 7 shows an exemplary perturbation value generated from a perturbation walk partition, according to one embodiment of the present disclosure. In various embodiments, FIG. 7 shows a perturbation value partition 700 that corresponds to $F \sim \mathcal{N}(0, \lambda/2)$ partitioned by $G \sim B(2\lambda, \frac{1}{2})$ as $(i_{-\lambda-1} \ldots i_\lambda)$. In one example, a privacy walk terminating at $W_\lambda(s) = -1$ after $\lambda = 5$ steps and uniform sample $\mu = 0.278$ yields the perturbation $\Delta_\lambda(s) = F^{1-}(0.23) = -1.86$.

Figure 8:
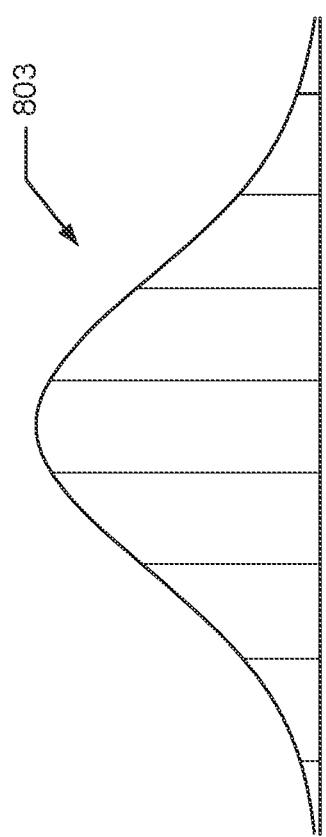
FIG. 8 shows uniform partitions and binomial partitions of a normal distribution, according to one embodiment of the present disclosure.
Figure 8:
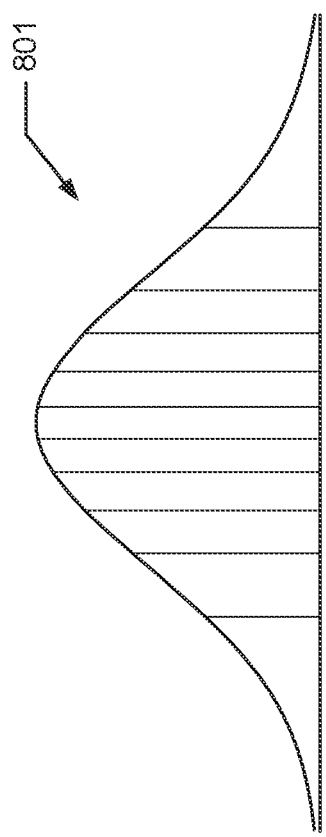

FIG. 8 shows uniform partitions 801 and binomial partitions 803. In various embodiments, the uniform partitions 801 may be expressed as $G \sim U\{-\lambda, \lambda\}$ and the binomial partitions 803 may be expressed as $G \sim B(2\lambda, \frac{1}{2})$ for a $F \sim \mathcal{N}(0, \lambda/2)$. In one or more embodiments, the uniform partitions 801 and binomial partitions 803 represent discontinuity correction partitions for $\mathcal{N}(0, \lambda/2)$ perturbations based on uniform and binomial distribution privacy walks with $\lambda = 5$ steps.

In one or more embodiments, if PRF in Algorithm 1 is taken to be a link in a secure hash chain such that PRF(t,s)= Hash$^t$(s), then the privacy at level λ is assured by the non-invertibility of Hash applied at level λ−1. In various embodiments, it is possible to protect multiple values $\vec{x} = (x_1, \ldots, x_n)$ using a common seed s by replacing PRF(t,s)=Hash$^t$(s) with PRF(t,s)=HMAC(Hash$^t$(s)) for each i corresponding to $x_i \in \vec{x}$.

In at least one embodiment, for a Gaussian mechanism, consider the de Moivre-Laplace theorem as $t \to \infty$:

$$\binom{2t}{t-k} p^{t+k} q^{t-k} \approx \mathcal{N}(t(p^2 - q^2), 2tpq), \; p + q = 1, \; p, q > 0$$

In various embodiments, taking $p = q = \frac{1}{2}$ shows that the centered binomial distribution converges to $\mathcal{N}(0, \lambda/2)$.

In one or more embodiments, as demonstrated in Proof 1 and since $\mathbb{P}[\Delta_{\lambda+1}(s) - \Delta_\lambda(s) = y_{\lambda+1} - y_\lambda]$ does not depend on k, if the transition function in a privacy walks does not depend on the current state, then learning the perturbed value $y_{\lambda+1} = x + \Delta_{\lambda+1}(s)$ for any i>0 after learning $y_\lambda = x + \Delta_\lambda(s)$ does not increase the information about x.

$$\mathbb{P}[x = k | y_\lambda = x + \Delta_\lambda(s), y_{\lambda+1} = x + \Delta_{\lambda+1}(s)] = \mathbb{P}[x = k | y_\lambda = \qquad \text{(Proof 1)}$$
$$x + \Delta_\lambda(s), \Delta_{\lambda+1}(s) -$$
$$\Delta_\lambda(s) = y_{\lambda+1} - y_\lambda]$$
$$= \mathbb{P}[x = k | y_\lambda =$$
$$x + \Delta_\lambda(s)]$$
$$= \mathbb{P}[\Delta_\lambda(s) = k - y_\lambda]$$

In various embodiments, the binomial distribution and Gaussian distributions do not leak information beyond the smallest known perturbation privacy level. In at least one embodiment, the state-transition function for the binomial distribution does not depend on the current state, and the binomial distribution converges to the normal distribution. In one or more embodiments, as supported by the above theorem and proof, the knowledge of larger privacy levels does not leak any new information.

In various embodiments, the inverse transform sampling technique shown and described herein maps a privacy walk output to a particular partition of the target output data perturbation distribution. In at least one embodiment, Proof 1 demonstrates that using binomial step probabilities to compute the privacy walk leaks as little information as possible. In one or more embodiments, combining the sampling and privacy minimization techniques provides a construction that can generate any output perturbation distribution without leaking any extra data privacy information. In at least one embodiment, for Algorithm 1, this means that binomial framework may be used to computed $b_1$ and $b_2$, and any target distribution may be used for the correction function.

Figure 9:
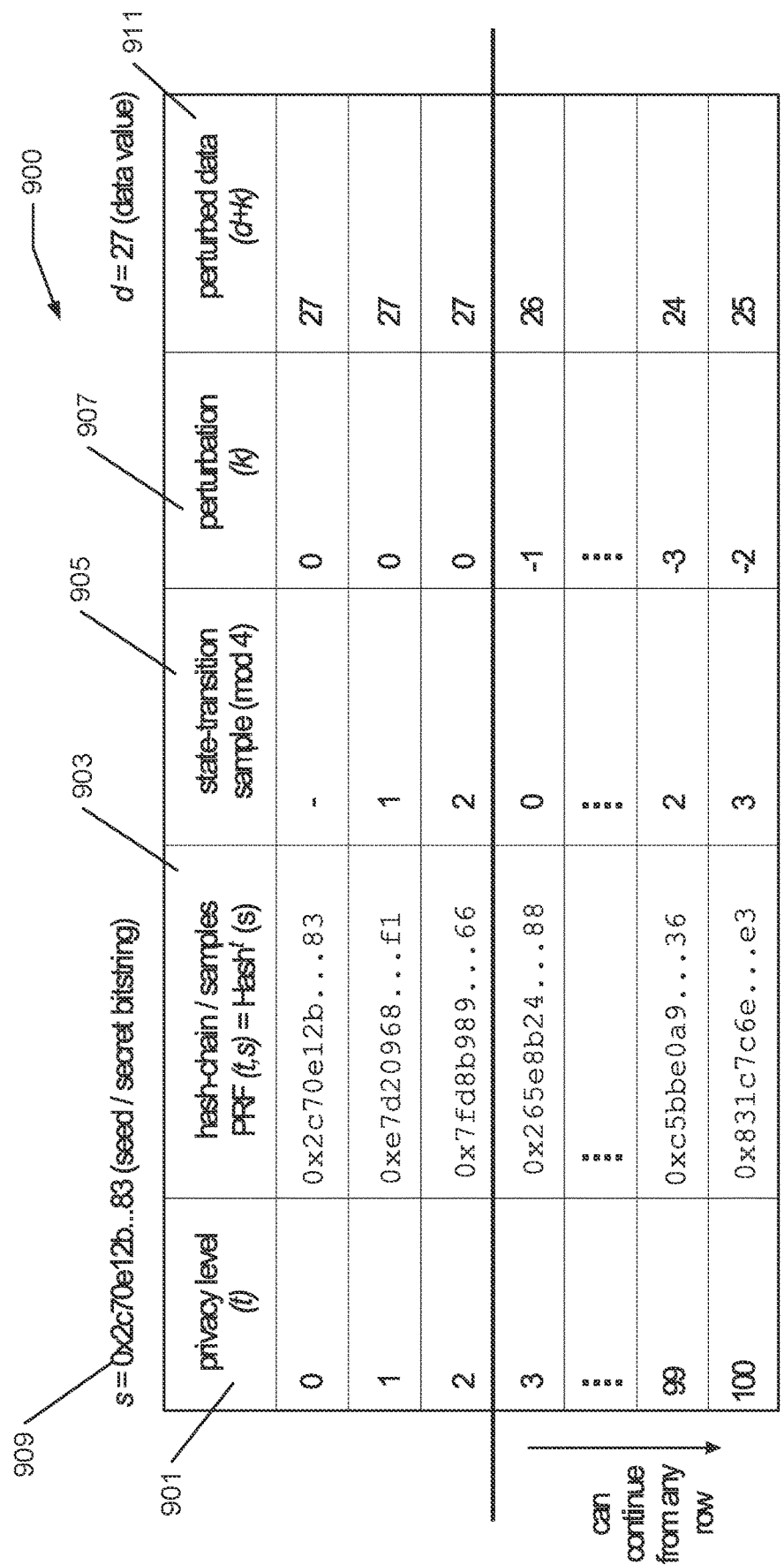
FIG. 9 shows an exemplary perturbation table, according to one embodiment of the present disclosure.

FIG. 9 shows an exemplary perturbation table 900 including privacy levels 901 and hash-chains 903 with which each privacy level 901 may be associated. In various embodiments, each hash-chain 903 is associated with a privacy walk step 905. In at least one embodiment, each privacy walk step 905 is associated with a perturbation value 907 generated by the entropy service 225 via the corresponding privacy walk step 905 using an arbitrary bitstring 909 that is associated with the hash-chain 903. In one or more embodiments, the entropy service 225 applies the perturbation value 907 to an original data value (e.g., or other perturbed data value) to generate perturbed data 911.

FIG. 10 shows an exemplary perturbation sequence 1000 by which the described contextual privacy systems may receive a query of a data value and apply a perturbation value to the data value based on a level of privacy with which the query, or querying party, is associated.

In one or more embodiments, the contextual privacy systems and processes described herein generate perturbation values according to a schema associated with a distribution of the data to-be-perturbed. In at least one embodiment, for data associated with a binomial distribution, the entropy service 225 (shown in FIG. 2 and described herein) generates perturbation values according to Schema 2. In at least one embodiment, the binomial distribution is special in the context of the perturbation workflow 500B shown in FIG. 5, the perturbation table 900 shown in FIG. 9 and the perturbation sequence 1000 shown in FIG. 10. In various embodiments, when using the binomial distribution to compute the privacy walk, the walk specification does not depend on the current state k (e.g., current perturbation from the original data value) and thus the transition may be computed client-side without leaking privacy. In one or more embodiments, the client-side computations may include the inverse transform sampling and privacy minimization techniques shown and described herein (see, for example, FIG. 8 and accompanying description).

In one or more embodiments, for data associated with a beta-binomial distribution, the entropy service 225 generates perturbation values according to Schema 3. In various embodiments, for data associated with a hypergeometric distribution, the entropy service 225 generates perturbation values according to Schema 4. In one or more embodiments, for data associated with a uniform distribution, the entropy service 225 generates perturbation values according to Schema 5. In at least one embodiment, for data associated with a geometric distribution, the entropy service 225 generates perturbation values according to Schema 6.

(Schema 2. Binomial Distribution)

Parameters. Support.
$0 \leq p \leq 1$: success probability    $k \in \{-t, \ldots, t\}$: walk state
$q = 1 - p$
$t \in \{0, 1, \ldots\}$: walk iteration
Probability Mass Function.
The probability of being at state k at time t is:

$$f(k) = \binom{2t}{t-k} p^{t+k} q^{t-k}$$

Uncertainty Measures.
Mean and Variance    Entropy (Schema 2. Binomial Distribution)

$\mu = t(2p - 1)$
$\sigma^2 = 2t\, p\, q$    $H \simeq \frac{1}{2}\ln(4\pi t p q) + \frac{1}{2} + O\left(\frac{1}{n}\right)$ Walk Specification.
State-Transition Probabilities    State-Transition Bounds
$L(t, k) = q^2$    $b_1(t, k) = (1 - p)^2$
$C(t, k) = 2\, p\, q$    $b_2(t, k) = 1 - p^2$
$R(t, k) = p^2$ (Schema 3. Beta-Binomial Distribution)

Parameters.    Support.
$\alpha > 0$ (real)    $k \in \{-t, \ldots, t\}$: walk state
$\beta > 0$ (real)
$t \in \{0, 1, \ldots\}$: walk iteration
Probability Mass Function.
The probability of being at state k at time t is:

$$f(k) = \binom{2t}{t-k} \frac{B(t+k+\alpha,\, t-k+\beta)}{B(\alpha, \beta)}$$

where $B(x, y) = \dfrac{\Gamma(x)\Gamma(y)}{\Gamma(x+y)}$ is the beta function

Uncertainty Measures.
Mean and Variance.    Entropy.

$\mu = t\left(\dfrac{\alpha - \beta}{\alpha + \beta}\right)$    $H(t) = -\sum_{k} f(k) \log f(k)$ $\sigma^2 = \dfrac{2t\,\alpha\,\beta\,(\alpha + \beta + 2t)}{(\alpha + \beta)^2\,(\alpha + \beta + 1)}$ Walk Specification.
State-Transition Probabilities.    State-Transition Bounds.

$L(t, k) = \dfrac{(t-k+\beta)(t-k+\beta+1)}{(2t+\alpha+\beta)(2t+\alpha+\beta+1)}$    $b_1(t, k) = \dfrac{(t-k+\beta)(t-k+\beta+1)}{(2t+\alpha+\beta)(2t+\alpha+\beta+1)}$ $C(t, k) = \dfrac{2(t+k+\alpha)(t-k+\beta)}{(2t+\alpha+\beta)(2t+\alpha+\beta+1)}$    $b_2(t, k) = \dfrac{(t-k+\beta)(t-k+\beta+1)}{(2t+\alpha+\beta)(2t+\alpha+\beta+1)}$ $R(t, k) = \dfrac{(t+k+\alpha)(t+k+\alpha+1)}{(2t+\alpha+\beta)(2t+\alpha+\beta+1)}$ (Schema 4. Hypergeometric Distribution)

Parameters.
$N \in \{0, 1, \ldots\}$: population size
$K \in \{0, 1, \ldots, N\}$: successful states in population
$t \in \{0, 1, \ldots, N\}$: number of steps in walk
Support.
$k \in \{\max(-t, t+K-N), \ldots, \min(t, K-t)\}$: walk state
Probability Mass Function.
The probability of being at state k at time t is:

$$f(k) = \frac{\binom{K}{t+k}\binom{N-K}{t-k}}{\binom{N}{2t}}$$

Uncertainty Measures.
Mean and Variance.    Entropy.

$\mu = t\left(2\dfrac{K}{N} - 1\right)$    $H(t) = -\sum_{k} f(k) \log f(k)$

| (Schema 4. Hypergeometric Distribution) |
| --- |

$$\sigma^2 = 2t\frac{K}{N}\frac{N-K}{K}\frac{N-2t}{N-1}$$

Walk Specification.
State-Transition Probabilities.

$$L(t, k) = \frac{(N-K-t+k)(N-K-t+k-1)}{(N-2t)(N-2t-1)}$$

$$C(t, k) = \frac{2(N-K-t+k)(K-t+k)}{(N-2t)(N-2t-1)}$$

$$R(t, k) = \frac{(K-t+k)(N-K-t+k-1)}{(N-2t)(N-2t-1)}$$

State-Transition Bounds.

$$b_1(t, k) = \frac{(N-k-t+k)(N-K-t+k-1)}{(N-2t)(N-2t-1)}$$

$$b_2(t, k) = \frac{(N-K-t+k)(N+K-3t-k-1)}{(N-2t)(N-2t-1)}$$

| +(Schema 5. Uniform Distribution) |
| --- |

Parameters.  Support.
$t \in \{0, 1, \ldots\}$: walk iteration    $k \in \{-t, \ldots, t\}$: walk state
Probability Mass Function.
The probability of being at state k at time t is:

$$f(k) = \frac{1}{2t+1}$$

Uncertainty Measures.
Mean and Variance.  Entropy.
$\mu = 0$    $H(t) = \ln(2t+1)$ $$\sigma^2 = \frac{t(t+1)}{3}$$

Walk Specification.
State-Transition Probabilities.   State-Transition Bounds.

$$L(t, k) = \frac{t-k+1}{2t+3} \qquad b_1(t, k) = \frac{t-k+1}{2t+3}$$

$$C(t, k) = \frac{1}{2t+3} \qquad b_2(t, k) = \frac{t-k+2}{2t+3}$$

$$R(t, k) = \frac{t+k+1}{2t+3}$$

| (Schema 6. Geometric Distribution) |
| --- |

Parameters.  Support.
$0 \leq p \leq 1$: success probability    $k \in \{0, \ldots, t\}$: walk state
$q = 1 - p$
$t \in \{0, 1, \ldots\}$: walk iteration
Probability Mass Function.
The probability of being at state k at time t is:

$$f(k) = \frac{pq^k}{1-q^{t+1}}$$

Uncertainty Measures.
Mean and Variance.  Entropy.

$$\mu = \frac{q}{p}\left(1 - q^t\left(\frac{p(t+1)}{1-q^{t+1}}\right)\right) \qquad H(t) = -\log(p) + \log(1-q^{t+1}) - \frac{q}{p}\log(q)\left(1 - q^t\left(\frac{p(t+1)}{1-q^{t+1}}\right)\right)$$

$$\sigma^2 = \frac{q}{p^2}\left(1 - q^t\left(\frac{p(t+1)}{1-q^{t+1}}\right)^2\right)$$

Walk Specification.
State-Transition Probabilities.   State-Transition Bounds.
$L(t, k) = 0$    $b_1(t, k) = 0$ $$C(t, k) = \frac{1-q^{t-k+1}}{1-q^{t+2}} \qquad b_2(t, k) = \frac{1-q^{t-k+1}}{1-q^{t+2}}$$

$$R(t, k) = \frac{q^{t-k+1} - q^{t+2}}{1-q^{t+2}}$$

According to a first aspect, a method, including: A) receiving, via at least one computing device, a request for a data variable associated with at least one entity; B) obtaining, via the at least one computing device, contextual data associated with at least one of: the data variable and the at least one entity; C) determining, via the at least one computing device, a particular probabilistic model of a plurality of probabilistic models based on the contextual data; D) generating, via the at least one computing device, a perturbation value by applying the particular probabilistic model; and E) in response to the request for the data variable, sending, via the at least one computing device, a de-identified value by modifying a current value of the data variable by the perturbation value.

According to a further aspect, the method of the first aspect or any other aspect, further including: A) generating, via the at least one computing device, a particular key for the data variable, wherein the particular probabilistic model is applied using the particular key; B) storing, via the at least one computing device, the particular key in a data store associated with the data variable; C) receiving, via the at least one computing device, a subsequent request for the data variable associated with the at least one entity; D) loading, via the at least one computing device, the particular key for the data variable; and E) generating, via the at least one computing device, a subsequent perturbation value by applying the particular probabilistic model using the particular key, wherein the subsequent perturbation value equals the perturbation value.

According to a further aspect, the method of the first aspect or any other aspect, further including applying a plurality of rules to the contextual data associated with the at least one of: the data variable and the at least one entity to determine the particular probabilistic model of the plurality of probabilistic models.

According to a further aspect, the method of the first aspect or any other aspect, further including applying a plurality of rules to particular data stored as the data variable to identify a subset of the contextual data associated with the at least one of: the data variable and the at least one entity to determine the particular probabilistic model of the plurality of probabilistic models.

According to a further aspect, the method of the first aspect or any other aspect, further including applying a plurality of rules to particular data stored as the data variable to identify a plurality of fields in the particular data to de-identify based on the perturbation value.

According to a further aspect, the method of the first aspect or any other aspect, further including, for each of the plurality of fields: A) iteratively generating, via the at least one computing device, a current iteration key for the data variable based on a particular key used to apply the particular probabilistic model; B) for each iteration, generating, via the at least one computing device, a current iteration perturbation value by applying the particular probabilistic model using the current iteration key; and C) determining, via the at least one computing device, a current iteration de-identified value by modifying a current field value of a current iteration field of the plurality of fields by the current iteration perturbation value, wherein sending the de-identified value includes sending the current iteration de-identified value for each of the plurality of fields.

According to a further aspect, the method of the first aspect or any other aspect, further including: A) determining, via the at least one computing device, a desired offset range for the data variable corresponding to the request for the data variable; B) determining, via the at least one computing device, a count of iterations based on the desired offset range; and C) to generate the perturbation value, iteratively performing, via the at least one computing device, a discrete-time Markov chain with a count of step transitions being based on the count of iterations.

According to a second aspect, a system, including: A) a data store associated with a data variable, wherein the data variable is associated with at least one entity; and B) at least one processor in communication with the data store, wherein the at least one processor is configured to: 1) receive, from at least one computing device, a request for the data variable associated with the at least one entity; 2) obtain contextual data associated with at least one of: the data variable and the at least one entity; 3) determine a particular probabilistic model of a plurality of probabilistic models based on the contextual data; 4) generate a perturbation value by applying the particular probabilistic model; and 5) in response to the request for the data variable, send, to the at least one computing device, a de-identified value by modifying a current value of the data variable by the perturbation value.

According to a further aspect, the system of the second aspect or any other aspect, wherein the at least one processor is configured to: A) generate a particular key for the data variable, wherein the particular probabilistic model is applied using the particular key; B) store the particular key in the data store; C) receive a subsequent request for the data variable associated with the at least one entity; D) load the particular key for the data variable; and E) generate a subsequent perturbation value by applying the particular probabilistic model using the particular key, wherein the subsequent perturbation value equals the perturbation value.

According to a further aspect, the system of claim 8, wherein the at least one processor is configured to apply a plurality of rules to the contextual data associated with the at least one of: the data variable and the at least one entity to determine the particular probabilistic model of the plurality of probabilistic models.

According to a further aspect, the system of claim 8, wherein the at least one processor is configured to apply a plurality of rules to particular data stored as the data variable to identify a subset of the contextual data associated with the at least one of: the data variable and the at least one entity to determine the particular probabilistic model of the plurality of probabilistic models.

According to a further aspect, the system of claim 8, wherein the at least one processor is configured to apply a plurality of rules to particular data stored as the data variable to identify a plurality of fields in the particular data to de-identify based on the perturbation value.

According to a further aspect, the system of the second aspect or any other aspect, wherein, for each of the plurality of fields, the at least one processor is configured to: A) iteratively generate a current iteration key for the data variable based on a particular key used to apply the particular probabilistic model; B) for each iteration, generate a current iteration perturbation value by applying the particular probabilistic model using the current iteration key; C) determine a current iteration de-identified value by modifying a current field value of a current iteration field of the plurality of fields by the current iteration perturbation value; and D) send the de-identified value by sending the current iteration de-identified value for each of the plurality of fields.

According to a further aspect, the system of the second aspect or any other aspect, wherein the at least one processor is configured to: A) determine a desired offset range for the data variable corresponding to the request for the data variable; B) determine a count of iterations based on the desired offset range; and C) to generate the perturbation value, iteratively perform a discrete-time Markov chain with a count of step transitions being based on the count of iterations.

According to a third aspect, a non-transitory, computer-readable medium including instructions that, when executed by a computer, cause the computer to: A) receive, from at least one computing device, a request for a data variable associated with at least one entity; B) obtain contextual data associated with at least one of: the data variable and the at least one entity; C) determine a particular probabilistic model of a plurality of probabilistic models based on the contextual data; D) generate, via the at least one computing device, a perturbation value by applying the particular probabilistic model; and E) in response to the request for the data variable, send, to the at least one computing device, a de-identified value by modifying a current value of the data variable by the perturbation value.

According to a further aspect, the non-transitory, computer-readable medium of the third aspect or any other aspect, wherein the instructions, when executed by the computer, cause the computer to: A) generate a particular key for the data variable, wherein the particular probabilistic model is applied using the particular key; B) store the particular key in a data store associated with the data variable; C) receive a subsequent request for the data variable associated with the at least one entity; D) load the particular key for the data variable; and E) generate a subsequent perturbation value by applying the particular probabilistic model using the particular key, wherein the subsequent perturbation value equals the perturbation value.

According to a further aspect, the non-transitory, computer-readable medium of the third aspect or any other aspect, wherein the instructions, when executed by the computer, cause the computer to apply a plurality of rules to the contextual data associated with the at least one of: the data variable and the at least one entity to determine the particular probabilistic model of the plurality of probabilistic models.

According to a further aspect, the non-transitory, computer-readable medium of the third aspect or any other aspect, wherein the instructions, when executed by the computer, cause the computer to apply a plurality of rules to particular data stored as the data variable to identify a subset of the contextual data associated with the at least one of: the data variable and the at least one entity to determine the particular probabilistic model of the plurality of probabilistic models.

According to a further aspect, the non-transitory, computer-readable medium of the third aspect or any other aspect, wherein the instructions, when executed by the computer, cause the computer to apply a plurality of rules to particular data stored as the data variable to identify a plurality of fields in the particular data to de-identify based on the perturbation value.

According to a further aspect, the non-transitory, computer-readable medium of the third aspect or any other aspect, wherein the instructions, when executed by the computer, cause the computer to: A) iteratively generate a current iteration key for the data variable based on a particular key used to apply the particular probabilistic model; B) for each iteration, generate a current iteration perturbation value by applying the particular probabilistic model using the current iteration key; C) determine a current iteration de-identified value by modifying a current field value of a current iteration field of the plurality of fields by the current iteration perturbation value; and D) send the de-identified value by sending the current iteration de-identified value for each of the plurality of fields.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. The computer-readable media can be non-transitory and can embody a program to be executed by a processor. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A method, comprising:
   receiving, via at least one computing device associated with a contextual privacy system of an organization, a request of a user for a data variable associated with at least one entity of a plurality of entities;

determining, via the at least one computing device associated with the contextual privacy system, that data variable is one of a plurality of data variables that contain privacy-sensitive information related to the plurality of entities and are stored in one or more data stores of the organization;

causing, via the at least one computing device associated with the contextual privacy system, the requested data variable to be de-identified based on one or more rules of the contextual privacy system, wherein causing the requested data variable to be de-identified comprises:

obtaining, via the at least one computing device associated with the contextual privacy system, contextual data associated with at least one of: the data variable and the at least one entity;

determining, via the at least one computing device associated with the contextual privacy system, a particular probabilistic model of a plurality of probabilistic models based on the contextual data; and generating, via the at least one computing device associated with the contextual privacy system, a perturbation value by applying the particular probabilistic model using a particular key as input to the particular probabilistic model; and in response to the request of the user for the data variable, sending, via the at least one computing device associated with the contextual privacy system, a de-identified value to a computing device of the user by modifying a current value of the data variable by the perturbation value.

2. The method of claim 1, further comprising:

generating, via the at least one computing device, the particular key for the data variable, wherein the particular probabilistic model is applied using the particular key;

storing, via the at least one computing device, the particular key in a data store associated with the data variable;

receiving, via the at least one computing device, a subsequent request for the data variable associated with the at least one entity;

loading, via the at least one computing device, the particular key for the data variable; and generating, via the at least one computing device, a subsequent perturbation value by applying the particular probabilistic model using the particular key, wherein the subsequent perturbation value equals the perturbation value.

3. The method of claim 1, further comprising applying the one or more rules to the contextual data associated with the at least one of: the data variable and the at least one entity to determine the particular probabilistic model of the plurality of probabilistic models.

4. The method of claim 1, further comprising applying the one or more rules to particular data stored as the data variable to identify a subset of the contextual data associated with the at least one of: the data variable and the at least one entity to determine the particular probabilistic model of the plurality of probabilistic models.

5. The method of claim 1, further comprising applying the one or more rules to particular data stored as the data variable to identify a plurality of fields in the particular data to de-identify based on the perturbation value.

6. The method of claim 5, further comprising, for each of the plurality of fields:

iteratively generating, via the at least one computing device, a current iteration key for the data variable based on the particular key used to apply the particular probabilistic model;

for each iteration, generating, via the at least one computing device, a current iteration perturbation value by applying the particular probabilistic model using the current iteration key; and determining, via the at least one computing device, a current iteration de-identified value by modifying a current field value of a current iteration field of the plurality of fields by the current iteration perturbation value, wherein sending the de-identified value comprises sending the current iteration de-identified value for each of the plurality of fields.

7. The method of claim 1, further comprising:

determining, via the at least one computing device, a desired offset range for the data variable corresponding to the request for the data variable;

determining, via the at least one computing device, a count of iterations based on the desired offset range; and to generate the perturbation value, iteratively performing, via the at least one computing device, a discrete-time Markov chain with a count of step transitions being based on the count of iterations.

8. A system, comprising:

a data store associated with a data variable, wherein the data variable is associated with at least one entity; and at least one processor in communication with the data store, wherein the at least one processor is configured to:

receive, via at least one computing device associated with a contextual privacy system of an organization, a request of a user for a data variable associated with at least one entity of a plurality of entities;

determine, via the at least one computing device associated with the contextual privacy system, that data variable is one of a plurality of data variables that contain privacy-sensitive information related to the plurality of entities and are stored in one or more data stores of the organization;

cause, via the at least one computing device associated with the contextual privacy system, the requested data variable to be de-identified based on one or more rules of the contextual privacy system, wherein causing the requested data variable to be de-identified comprises:

obtaining, via the at least one computing device associated with the contextual privacy system, contextual data associated with at least one of: the data variable and the at least one entity;

determining, via the at least one computing device associated with the contextual privacy system, a particular probabilistic model of a plurality of probabilistic models based on the contextual data; and generating, via the at least one computing device associated with the contextual privacy system, a perturbation value by applying the particular probabilistic model using a particular key as input to the particular probabilistic model; and in response to the request of the user for the data variable, send, via the at least one computing device associated with the contextual privacy system, a de-identified value to a computing device of the user by modifying a current value of the data variable by the perturbation value.

9. The system of claim 8, wherein the at least one processor is configured to:
   generate the particular key for the data variable, wherein the particular probabilistic model is applied using the particular key;
   store the particular key in the data store;
   receive a subsequent request for the data variable associated with the at least one entity;
   load the particular key for the data variable; and
   generate a subsequent perturbation value by applying the particular probabilistic model using the particular key, wherein the subsequent perturbation value equals the perturbation value.

10. The system of claim 8, wherein the at least one processor is configured to apply the one or more rules to the contextual data associated with the at least one of: the data variable and the at least one entity to determine the particular probabilistic model of the plurality of probabilistic models.

11. The system of claim 8, wherein the at least one processor is configured to apply the one or more rules to particular data stored as the data variable to identify a subset of the contextual data associated with the at least one of: the data variable and the at least one entity to determine the particular probabilistic model of the plurality of probabilistic models.

12. The system of claim 8, wherein the at least one processor is configured to apply the one or more rules to particular data stored as the data variable to identify a plurality of fields in the particular data to de-identify based on the perturbation value.

13. The system of claim 12, wherein, for each of the plurality of fields, the at least one processor is configured to:
   iteratively generate a current iteration key for the data variable based on the particular key used to apply the particular probabilistic model;
   for each iteration, generate a current iteration perturbation value by applying the particular probabilistic model using the current iteration key;
   determine a current iteration de-identified value by modifying a current field value of a current iteration field of the plurality of fields by the current iteration perturbation value; and
   send the de-identified value by sending the current iteration de-identified value for each of the plurality of fields.

14. The system of claim 8, wherein the at least one processor is configured to:
   determine a desired offset range for the data variable corresponding to the request for the data variable;
   determine a count of iterations based on the desired offset range; and
   to generate the perturbation value, iteratively perform a discrete-time Markov chain with a count of step transitions being based on the count of iterations.

15. A non-transitory, computer-readable medium comprising instructions that, when executed by a computer, cause the computer to:
   receive, via at least one computing device associated with a contextual privacy system of an organization, a request of a user for a data variable associated with at least one entity of a plurality of entities;
   determine, via the at least one computing device associated with the contextual privacy system, that data variable is one of a plurality of data variables that contain privacy-sensitive information related to the plurality of entities and are stored in one or more data stores of the organization;
   cause, via the at least one computing device associated with the contextual privacy system, the requested data variable to be de-identified based on one or more rules of the contextual privacy system, wherein causing the requested data variable to be de-identified comprises:
      obtaining, via the at least one computing device associated with the contextual privacy system, contextual data associated with at least one of: the data variable and the at least one entity;
      determining, via the at least one computing device associated with the contextual privacy system, a particular probabilistic model of a plurality of probabilistic models based on the contextual data; and
      generating, via the at least one computing device associated with the contextual privacy system, a perturbation value by applying the particular probabilistic model using a particular key as input to the particular probabilistic model; and
   in response to the request of the user for the data variable, send, via the at least one computing device associated with the contextual privacy system, a de-identified value to a computing device of the user by modifying a current value of the data variable by the perturbation value.

16. The non-transitory, computer-readable medium of claim 15, wherein the instructions, when executed by the computer, cause the computer to:
   generate the particular key for the data variable, wherein the particular probabilistic model is applied using the particular key;
   store the particular key in a data store associated with the data variable;
   receive a subsequent request for the data variable associated with the at least one entity;
   load the particular key for the data variable; and
   generate a subsequent perturbation value by applying the particular probabilistic model using the particular key, wherein the subsequent perturbation value equals the perturbation value.

17. The non-transitory, computer-readable medium of claim 15, wherein the instructions, when executed by the computer, cause the computer to apply the one or more rules to the contextual data associated with the at least one of: the data variable and the at least one entity to determine the particular probabilistic model of the plurality of probabilistic models.

18. The non-transitory, computer-readable medium of claim 15, wherein the instructions, when executed by the computer, cause the computer to apply the one or more rules to particular data stored as the data variable to identify a subset of the contextual data associated with the at least one of: the data variable and the at least one entity to determine the particular probabilistic model of the plurality of probabilistic models.

19. The non-transitory, computer-readable medium of claim 15, wherein the instructions, when executed by the computer, cause the computer to apply the one or more to particular data stored as the data variable to identify a plurality of fields in the particular data to de-identify based on the perturbation value.

20. The non-transitory, computer-readable medium of claim 19, wherein the instructions, when executed by the computer, cause the computer to:
   iteratively generate a current iteration key for the data variable based on the particular key used to apply the particular probabilistic model;

for each iteration, generate a current iteration perturbation value by applying the particular probabilistic model using the current iteration key;

determine a current iteration de-identified value by modifying a current field value of a current iteration field of the plurality of fields by the current iteration perturbation value; and send the de-identified value by sending the current iteration de-identified value for each of the plurality of fields.

* * * * *